(12) United States Patent
Abdelghaffar et al.

(10) Patent No.: US 12,349,150 B2
(45) Date of Patent: Jul. 1, 2025

(54) MULTIPLE SOUNDING REFERENCE SIGNAL TRANSMISSIONS TRIGGERED BY DOWNLINK CONTROL INFORMATION

(71) Applicant: QUALCOMM Incorporated, San Diego, CA (US)

(72) Inventors: Muhammad Sayed Khairy Abdelghaffar, San Jose, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 642 days.

(21) Appl. No.: 17/575,341

(22) Filed: Jan. 13, 2022

(65) Prior Publication Data

US 2022/0232535 A1    Jul. 21, 2022

Related U.S. Application Data

(60) Provisional application No. 63/138,512, filed on Jan. 17, 2021.

(51) Int. Cl.
*H04W 72/23* (2023.01)
*H04L 1/1607* (2023.01)
*H04L 5/00* (2006.01)
*H04W 72/0446* (2023.01)
*H04W 72/0453* (2023.01)

(52) U.S. Cl.
CPC .......... *H04W 72/23* (2023.01); *H04L 1/1678* (2013.01); *H04L 5/0051* (2013.01); *H04W 72/0446* (2013.01); *H04W 72/0453* (2013.01)

(58) Field of Classification Search
None
See application file for complete search history.

(56) References Cited

U.S. PATENT DOCUMENTS

2019/0190582 A1\* 6/2019 Guo ................ H04B 17/17
2019/0297603 A1\* 9/2019 Guo ................ H04L 5/0053
(Continued)

FOREIGN PATENT DOCUMENTS

CN         111885683 A  \* 11/2020  .......... H04B 7/0626
WO   WO-2021043008 A1 \*  3/2021  ............ H04B 17/30
WO   WO-2022151390 A1 \*  7/2022

OTHER PUBLICATIONS

International Search Report and Written Opinion—PCT/US2022/012431—ISA/EPO—Jun. 14, 2022 (2101718WO).

(Continued)

*Primary Examiner* — Kodzovi Acolatse
(74) *Attorney, Agent, or Firm* — Holland & Hart LLP/Qualcomm

(57) ABSTRACT

Methods, systems, and devices for wireless communications are described. A user equipment (UE) may use the techniques described herein to identify slots in which to transmit multiple sounding reference signal (SRS) resource sets triggered by one or more downlink control information (DCI) messages. In one aspect, the UE may determine a next available slot for transmitting an SRS resource set based on the available information at a timestamp and on a reference slot (e.g., the slot in which the latest DCI message is received or a slot that is offset from the slot in which the latest DCI message is received). In yet another aspect, the UE may receive one or more indications of slots in which to transmit the multiple SRS resource sets. In yet another aspect, the UE may follow one or more rules to identify slots in which to transmit the multiple SRS resource sets.

30 Claims, 21 Drawing Sheets

(56) References Cited

U.S. PATENT DOCUMENTS

| | | | |
|---|---|---|---|
| 2020/0267712 A1* | 8/2020 | Cirik | H04L 5/0023 |
| 2020/0382253 A1 | 12/2020 | Manolakos et al. | |
| 2021/0050968 A1* | 2/2021 | Yi | H04L 5/0048 |
| 2021/0144720 A1* | 5/2021 | Xu | H04L 5/0051 |
| 2021/0167821 A1* | 6/2021 | Chen | H04B 7/0617 |
| 2021/0184812 A1* | 6/2021 | MolavianJazi | H04L 1/0041 |
| 2021/0194737 A1* | 6/2021 | Gao | H04W 72/53 |
| 2021/0243659 A1* | 8/2021 | Cirik | H04L 5/0048 |
| 2021/0367727 A1* | 11/2021 | Go | H04L 5/0048 |
| 2022/0014328 A1* | 1/2022 | Sakhnini | H04L 5/005 |
| 2022/0167279 A1* | 5/2022 | Zhou | H04W 52/146 |
| 2022/0201679 A1* | 6/2022 | Lim | H04W 8/22 |
| 2022/0353887 A1* | 11/2022 | Xu | H04W 72/21 |
| 2022/0360405 A1* | 11/2022 | Jiang | H04L 5/001 |
| 2023/0171766 A1* | 6/2023 | Lin | H04L 1/08 370/329 |
| 2023/0216639 A1* | 7/2023 | Wang | H04L 5/0051 370/329 |
| 2023/0239125 A1* | 7/2023 | Yi | H04L 5/0048 370/329 |
| 2023/0396373 A1* | 12/2023 | Gao | H04L 1/1861 |
| 2024/0032025 A1* | 1/2024 | Gao | H04W 72/232 |
| 2024/0032082 A1* | 1/2024 | Xu | H04W 72/53 |
| 2024/0106614 A1* | 3/2024 | Gao | H04L 5/0094 |
| 2024/0155517 A1* | 5/2024 | Wang | H04W 52/58 |

OTHER PUBLICATIONS

European Search Report—EP24156799—Search Authority—The Hague—Jun. 4, 2024 (2101718EPD1).

Interdigital: "Discussion on SRS Enhancements", 3GPP TSG RAN WG1 #103-e, R1-2007631, 3rd Generation Partnership Project, Mobile Competence Centre, 650, Route Des Lucioles, F-06921, Sophia-Antipolis Cedex, France, vol. RAN WG1, No. e-Meeting, Oct. 26, 2020-Nov. 13, 2020, Oct. 23, 2020, XP051945285, 6 Pages, section 2.

ERICSSON: "On Support of Aperiodic CSI-Rs Triggering with Mixed Numerology", 3GPP TSG-RAN WG1 Meeting #98bis, 3GPP Draft, R1-1910898, On Support of Aperiodic CSI-Rs Triggering with Mixed Numerology, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, pp. 1-8, Oct. 4, 2019 (Oct. 4, 2019), XP051808289, Retrieved from the Internet: URL: https://ftp.3gpp.org/tsg_ran/WG1_RL1/TSGR1_98b/Docs/R1-1910898.zip R1-1910898 On support of aperiodic CSI-RS triggering with mixed numerology.docx [retrieved on Oct. 4, 2019] sections 2-5.

Moderator (ZTE): "FL Summary #2 on SRS Enhancements", 3GPP TSG RAN WG1 Meeting #103-e, 3GPP Draft, R1-2009650, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, 21 Pages, Nov. 11, 2020 (Nov. 11, 2020),XP051953507, Retrieved from the Internet: URL: https://ftp.3gpp.org/tsg_ran/WG1_RL1/TSGR1_103-e/Docs/R1-2009650.zip R1-2009650 FL summary #2 on SRS enhancements.docx[retrieved on Nov. 11, 2020] sections 2, 6.

Partial International Search Report—PCT/US2022/012431—ISA/EPO—Apr. 20, 2022 (2101718WO).

* cited by examiner

MULTIPLE SOUNDING REFERENCE SIGNAL TRANSMISSIONS TRIGGERED BY DOWNLINK CONTROL INFORMATION

CROSS REFERENCE

The present application for patent claims the benefit of U.S. Provisional Patent Application No. 63/138,512 by ABDELGHAFFAR et al., entitled "MULTIPLE SOUNDING REFERENCE SIGNAL TRANSMISSIONS TRIGGERED BY DOWNLINK CONTROL INFORMATION," filed Jan. 17, 2021, assigned to the assignee hereof, and expressly incorporated by reference herein.

FIELD OF TECHNOLOGY

The following relates to wireless communications, including multiple sounding reference signal transmissions triggered by downlink control information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as a user equipment (UE). In some wireless communications systems, the UEs may be configured to transmit sounding reference signal (SRS) resource sets to a base station to allow the base station to determine channel quality and efficiently schedule communications with the UE. Efficient techniques for triggering a UE to transmit multiple SRS resource sets may be desirable.

SUMMARY

The described techniques relate to improved methods, systems, devices, and apparatuses that support multiple sounding reference signal (SRS) transmissions triggered by downlink control information (DCI). A user equipment (UE) may use the techniques described herein to identify slots in which to transmit multiple SRS resource sets triggered by one or more DCI messages. In one aspect, the UE may determine a next available slot for transmitting an SRS resource set based on the available information at a timestamp and on a reference slot (e.g., the slot in which the latest DCI message is received or a slot that is offset from the slot in which the latest DCI message is received). In yet another aspect, the UE may receive one or more indications of slots in which to transmit the multiple SRS resource sets. In yet another aspect, the UE may follow one or more rules to identify slots in which to transmit the multiple SRS resource sets.

A method for wireless communication at a UE is described. The method may include receiving first downlink control information from a first transmission and reception point, the first downlink control information triggering transmission of a first sounding reference signal resource set, receiving second downlink control information from a second transmission and reception point, the second downlink control information triggering transmission of a second sounding reference signal resource set, identifying a reference slot for the first sounding reference signal resource set and the second sounding reference signal resource set, identifying a first available slot for the first sounding reference signal resource set and a second available slot for the second sounding reference signal resource set, where the first available slot is offset from the reference slot by a first offset (e.g., a first available slot offset) indicated in the first downlink control information and the second available slot is offset from the reference slot by a second offset (e.g., a second available offset) indicated in the second downlink control information, and transmitting the first sounding reference signal resource set in the first available slot and the second sounding reference signal resource set in the second available slot.

An apparatus for wireless communication at a UE is described. The apparatus may include a processor, memory in electronic communication with the processor, and instructions stored in the memory. The instructions may be executable by the processor to cause the apparatus to receive first downlink control information from a first transmission and reception point, the first downlink control information triggering transmission of a first sounding reference signal resource set, receive second downlink control information from a second transmission and reception point, the second downlink control information triggering transmission of a second sounding reference signal resource set, identify a reference slot for the first sounding reference signal resource set and the second sounding reference signal resource set, identify a first available slot for the first sounding reference signal resource set and a second available slot for the second sounding reference signal resource set, where the first available slot is offset from the reference slot by a first available slot offset indicated in the first downlink control information and the second available slot is offset from the reference slot by a second available slot offset indicated in the second downlink control information, and transmit the first sounding reference signal resource set in the first available slot and the second sounding reference signal resource set in the second available slot.

Another apparatus for wireless communication at a UE is described. The apparatus may include means for receiving first downlink control information from a first transmission and reception point, the first downlink control information triggering transmission of a first sounding reference signal resource set, means for receiving second downlink control information from a second transmission and reception point, the second downlink control information triggering transmission of a second sounding reference signal resource set, means for identifying a reference slot for the first sounding reference signal resource set and the second sounding reference signal resource set, means for identifying a first available slot for the first sounding reference signal resource set and a second available slot for the second sounding reference signal resource set, where the first available slot is offset from the reference slot by a first available slot offset indicated in the first downlink control information and the second available slot is offset from the reference slot by a second available slot offset indicated in the second downlink control information, and means for transmitting the first sounding reference signal resource set in the first available slot and the second sounding reference signal resource set in the second available slot.

A non-transitory computer-readable medium storing code for wireless communication at a UE is described. The code may include instructions executable by a processor to receive first downlink control information from a first transmission and reception point, the first downlink control information triggering transmission of a first sounding reference signal resource set, receive second downlink control information from a second transmission and reception point, the second downlink control information triggering transmission of a second sounding reference signal resource set, identify a reference slot for the first sounding reference signal resource set and the second sounding reference signal resource set, identify a first available slot for the first sounding reference signal resource set and a second available slot for the second sounding reference signal resource set, where the first available slot is offset from the reference slot by a first available slot offset indicated in the first downlink control information and the second available slot is offset from the reference slot by a second available slot offset indicated in the second downlink control information, and transmit the first sounding reference signal resource set in the first available slot and the second sounding reference signal resource set in the second available slot.

In some examples of the method, apparatuses, and non-transitory computer-readable medium described herein, identifying the first available slot for the first sounding reference signal resource set may include operations, features, means, or instructions for identifying the first available slot for the first sounding reference signal resource set from one or more candidate slots following a processing time after a timestamp determined based on receiving the first downlink control information and the second downlink control information. Some examples of the method, apparatuses, and non-transitory computer-readable medium described herein may further include operations, features, means, or instructions for identifying the timestamp as a last symbol of a control channel that includes the second downlink control information or a last symbol of a search space associated with the control channel that includes the second downlink control information.

In some examples of the method, apparatuses, and non-transitory computer-readable medium described herein, identifying the first available slot for the first sounding reference signal resource set may include operations, features, means, or instructions for identifying the first available slot for the first sounding reference signal resource set from one or more candidate slots following a timestamp determined based on receiving the first downlink control information and the second downlink control information. Some examples of the method, apparatuses, and non-transitory computer-readable medium described herein may further include operations, features, means, or instructions for identifying the timestamp as a symbol preceding one or more symbols in a candidate slot available for the first sounding reference signal resource set by a processing time.

In some examples of the method, apparatuses, and non-transitory computer-readable medium described herein, the second downlink control information may be received and correctly decoded by the timestamp. In some examples of the method, apparatuses, and non-transitory computer-readable medium described herein, at least one of the first downlink control information or the second downlink control information may be received and correctly decoded by the timestamp.

Some examples of the method, apparatuses, and non-transitory computer-readable medium described herein may further include operations, features, means, or instructions for determining the reference slot to be a slot in which the second downlink control information may be received. Some examples of the method, apparatuses, and non-transitory computer-readable medium described herein may further include operations, features, means, or instructions for receiving an indication of an offset in the second downlink control information and determining the reference slot based on the offset and a slot in which the second downlink control information may be received.

A method for wireless communication at a UE is described. The method may include receiving a configuration message indicating a first list of offsets for a first sounding reference signal resource set and a second list of offsets for a second sounding reference signal resource set, receiving downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set, and transmitting the first sounding reference signal resource set in the first available slot, the second sounding reference signal resource set in the second available slot, or both.

An apparatus for wireless communication at a UE is described. The apparatus may include a processor, memory in electronic communication with the processor, and instructions stored in the memory. The instructions may be executable by the processor to cause the apparatus to receive a configuration message indicating a first list of offsets for a first sounding reference signal resource set and a second list of offsets for a second sounding reference signal resource set, receive downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set, and transmit the first sounding reference signal resource set in the first available slot, the second sounding reference signal resource set in the second available slot, or both.

Another apparatus for wireless communication at a UE is described. The apparatus may include means for receiving a configuration message indicating a first list of offsets for a first sounding reference signal resource set and a second list of offsets for a second sounding reference signal resource set, means for receiving downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set, and means for transmitting the first sounding reference signal resource set in the first available slot, the second sounding reference signal resource set in the second available slot, or both.

A non-transitory computer-readable medium storing code for wireless communication at a UE is described. The code may include instructions executable by a processor to receive a configuration message indicating a first list of offsets for a first sounding reference signal resource set and a second list of offsets for a second sounding reference signal resource set, receive downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set, and transmit the first sounding reference signal resource set in the first available slot, the second sounding reference signal resource set in the second available slot, or both.

Some examples of the method, apparatuses, and non-transitory computer-readable medium described herein may further include operations, features, means, or instructions for receiving, in the downlink control information, a bit field indicating the first available slot offset and the second available slot offset. Some examples of the method, apparatuses, and non-transitory computer-readable medium described herein may further include operations, features, means, or instructions for receiving, in the configuration message, a first list of triggering codes for triggering transmission of the first sounding reference signal resource set, where each triggering code in the first list corresponds to an offset for the first sounding reference signal resource set and receiving, in the downlink control information, a triggering code from the first list of triggering codes triggering transmission of the first sounding reference signal resource set and indicating the first available slot offset.

Some examples of the method, apparatuses, and non-transitory computer-readable medium described herein may further include operations, features, means, or instructions for receiving, in the downlink control information, a first bit field indicating the first available slot offset and a second bit field indicating the second available slot offset. Some examples of the method, apparatuses, and non-transitory computer-readable medium described herein may further include operations, features, means, or instructions for determining that the first bit field indicates the first available slot offset and the second bit field indicates the second available slot offset based on an order of the first bit field and the second bit field in the downlink control information.

Some examples of the method, apparatuses, and non-transitory computer-readable medium described herein may further include operations, features, means, or instructions for identifying the first available slot for the first sounding reference signal resource set before the second available slot for the second sounding reference signal resource set and identifying the second available slot for the second sounding reference signal resource set based on the first available slot being unavailable for the second sounding reference signal resource set.

In some examples of the method, apparatuses, and non-transitory computer-readable medium described herein, identifying the first available slot before the second available slot may include operations, features, means, or instructions for identifying the first available slot before the second available slot based on the first available slot offset being greater than the second available slot offset. In some examples of the method, apparatuses, and non-transitory computer-readable medium described herein, identifying the first available slot before the second available slot may include operations, features, means, or instructions for identifying the first available slot before the second available slot based on the first available slot offset being less than the second available slot offset.

In some examples of the method, apparatuses, and non-transitory computer-readable medium described herein, identifying the first available slot before the second available slot may include operations, features, means, or instructions for identifying the first available slot before the second available slot based on a first index of the first sounding reference signal resource set and a second index of the second sounding reference signal resource set. In some examples of the method, apparatuses, and non-transitory computer-readable medium described herein, identifying the first available slot before the second available slot may include operations, features, means, or instructions for identifying the first available slot before the second available slot based on a first usage of the first sounding reference signal resource set and a second usage of the second sounding reference signal resource set.

In some examples of the method, apparatuses, and non-transitory computer-readable medium described herein, identifying the first available slot before the second available slot may include operations, features, means, or instructions for identifying the first available slot before the second available slot based on the first sounding reference signal resource set being scheduled for transmission on partial frequency resources. In some examples of the method, apparatuses, and non-transitory computer-readable medium described herein, identifying the first available slot before the second available slot may include operations, features, means, or instructions for identifying the first available slot before the second available slot based on a first configuration of the first sounding reference signal resource set and a second configuration of the second sounding reference signal resource set, where the first configuration and the second configuration each include a number of sounding reference signal resources, a transmit power, a frequency hopping configuration, a number of repetitions, or any combination thereof.

In some examples of the method, apparatuses, and non-transitory computer-readable medium described herein, identifying the first available slot before the second available slot may include operations, features, means, or instructions for identifying the first available slot before the second available slot based on the first available slot offset being different than the second available slot offset, a first index of the first sounding reference signal resource set, a second index of the second sounding reference signal resource set, the first sounding reference signal resource set being scheduled for transmission on partial frequency resources, a first configuration of the first sounding reference signal resource set, a second configuration of the second sounding reference signal resource set, or any combination thereof, where the first configuration and the second configuration each include a number of sounding reference signal resources, a transmit power, a frequency hopping configuration, a number of repetitions, or any combination thereof.

In some examples of the method, apparatuses, and non-transitory computer-readable medium described herein, the first available slot indicated for the first sounding reference signal resource set and the second available slot indicated for the second sounding reference signal resource set may be a same slot. In some examples of the method, apparatuses, and non-transitory computer-readable medium described herein, transmitting the first sounding reference signal resource set, the second sounding reference signal resource set, or both may include operations, features, means, or instructions for transmitting the first sounding reference signal resource set on a first subset of symbols in the same slot and transmitting the second sounding reference signal resource set on a second subset of symbols in the same slot.

In some examples of the method, apparatuses, and non-transitory computer-readable medium described herein, transmitting the first sounding reference signal resource set, the second sounding reference signal resource set, or both may include operations, features, means, or instructions for transmitting either the first sounding reference signal resource set or the second sounding reference signal resource set. Some examples of the method, apparatuses, and non-transitory computer-readable medium described herein may further include operations, features, means, or instructions for determining whether to transmit the first sounding reference signal resource set or the second sounding reference signal resource set based on a first usage, index, or configuration of the first sounding reference signal resource set and a second usage, index, or configuration of the second sounding reference signal resource set.

A method for wireless communication at a base station is described. The method may include transmitting a configuration message indicating a first list of offsets for a first sounding reference signal resource set and a second list of offsets for a second sounding reference signal resource set, transmitting downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set, and receiving the first sounding reference signal resource set in the first available slot, the second sounding reference signal resource set in the second available slot, or both.

An apparatus for wireless communication at a base station is described. The apparatus may include a processor, memory in electronic communication with the processor, and instructions stored in the memory. The instructions may be executable by the processor to cause the apparatus to transmit a configuration message indicating a first list of offsets for a first sounding reference signal resource set and a second list of offsets for a second sounding reference signal resource set, transmit downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set, and receive the first sounding reference signal resource set in the first available slot, the second sounding reference signal resource set in the second available slot, or both.

Another apparatus for wireless communication at a base station is described. The apparatus may include means for transmitting a configuration message indicating a first list of offsets for a first sounding reference signal resource set and a second list of offsets for a second sounding reference signal resource set, means for transmitting downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set, and means for receiving the first sounding reference signal resource set in the first available slot, the second sounding reference signal resource set in the second available slot, or both.

A non-transitory computer-readable medium storing code for wireless communication at a base station is described. The code may include instructions executable by a processor to transmit a configuration message indicating a first list of offsets for a first sounding reference signal resource set and a second list of offsets for a second sounding reference signal resource set, transmit downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set, and receive the first sounding reference signal resource set in the first available slot, the second sounding reference signal resource set in the second available slot, or both.

Some examples of the method, apparatuses, and non-transitory computer-readable medium described herein may further include operations, features, means, or instructions for transmitting, in the downlink control information, a bit field indicating the first available slot offset and the second available slot offset. Some examples of the method, apparatuses, and non-transitory computer-readable medium described herein may further include operations, features, means, or instructions for transmitting, in the configuration message, a first list of triggering codes for triggering transmission of the first sounding reference signal resource set, where each triggering code in the first list corresponds to an offset for the first sounding reference signal resource set and transmitting, in the downlink control information, a triggering code from the first list of triggering codes triggering transmission of the first sounding reference signal resource set and indicating the first available slot offset.

Some examples of the method, apparatuses, and non-transitory computer-readable medium described herein may further include operations, features, means, or instructions for transmitting, in the downlink control information, a first bit field indicating the first available slot offset and a second bit field indicating the second available slot offset. In some examples of the method, apparatuses, and non-transitory computer-readable medium described herein, transmitting the first bit field indicating the first available slot offset and the second bit field indicating the second available slot offset may include operations, features, means, or instructions for transmitting the first bit field and the second bit field in an order such that the first bit field corresponds to the first sounding reference signal resource set and the second bit field corresponds to the second sounding reference signal resource set.

In some examples of the method, apparatuses, and non-transitory computer-readable medium described herein, the first available slot indicated for the first sounding reference signal resource set and the second available slot indicated for the second sounding reference signal resource set may be a same slot. In some examples of the method, apparatuses, and non-transitory computer-readable medium described herein, receiving the first sounding reference signal resource set, the second sounding reference signal resource set, or both may include operations, features, means, or instructions for receiving the first sounding reference signal resource set on a first subset of symbols in the same slot and receiving the second sounding reference signal resource set on a second subset of symbols in the same slot. In some examples of the method, apparatuses, and non-transitory computer-readable medium described herein, receiving the first sounding reference signal resource set, the second sounding reference signal resource set, or both may include operations, features, means, or instructions for receiving either the first sounding reference signal resource set or the second sounding reference signal resource set.

A method for wireless communication at a user equipment (UE) is described. The method may include receiving, at a first time, a first downlink control information from a first transmission and reception point, the first downlink control information triggering transmission of a first sounding reference signal resource set, receiving, at a second time, second downlink control information from a second transmission and reception point, the second downlink control information triggering transmission of a second sounding reference signal resource set, where the first time occurs before the second time, identifying a reference slot for the first sounding reference signal resource set and the second sounding reference signal resource set, identifying a timestamp as a last symbol of a control channel that includes the second downlink control information or a last symbol of a search space associated with the control channel that includes the second downlink control information, identifying each of a first available slot for the first sounding reference signal resource set and a second available slot for the second sounding reference signal resource set based at least in part on a processing time after the timestamp, where the first available slot is offset from the reference slot by a first available slot offset and the second available slot is offset from the reference slot by a second available slot offset, and transmitting the first sounding reference signal resource set in the first available slot and the second sounding reference signal resource set in the second available slot.

An apparatus for wireless communication at a UE is described. The apparatus may include a processor, memory coupled with the processor, and instructions stored in the memory. The instructions may be executable by the processor to cause the apparatus to receive, at a first time, first downlink control information from a first transmission and reception point, the first downlink control information triggering transmission of a first sounding reference signal resource set, receive, at a second time, second downlink control information from a second transmission and reception point, the second downlink control information triggering transmission of a second sounding reference signal resource set, where the first time occurs before the second time, identify a reference slot for the first sounding reference signal resource set and the second sounding reference signal resource set, identify a timestamp as a last symbol of a control channel that includes the second downlink control information or a last symbol of a search space associated with the control channel that includes the second downlink control information, identify each of a first available slot for the first sounding reference signal resource set and a second available slot for the second sounding reference signal resource set based at least in part on a processing time after the timestamp, where the first available slot is offset from the reference slot by a first available slot offset and the second available slot is offset from the reference slot by a second available slot offset, and transmit the first sounding reference signal resource set in the first available slot and the second sounding reference signal resource set in the second available slot.

Another apparatus for wireless communication at a UE is described. The apparatus may include means for receiving, at a first time, a first downlink control information from a first transmission and reception point, the first downlink control information triggering transmission of a first sounding reference signal resource set, means for receiving, at a second time, second downlink control information from a second transmission and reception point, the second downlink control information triggering transmission of a second sounding reference signal resource set, where the first time occurs before the second time, means for identifying a reference slot for the first sounding reference signal resource set and the second sounding reference signal resource set, means for identifying a timestamp as a last symbol of a control channel that includes the second downlink control information or a last symbol of a search space associated with the control channel that includes the second downlink control information, means for identifying a first available slot for the first sounding reference signal resource set and a second available slot for the second sounding reference signal resource set based at least in part on a processing time, where the first available slot is offset from the reference slot by a first available slot offset and the second available slot is offset from the reference slot by a second available slot offset, and means for transmitting the first sounding reference signal resource set in the first available slot and the second sounding reference signal resource set in the second available slot.

A non-transitory computer-readable medium storing code for wireless communication at a UE is described. The code may include instructions executable by a processor to receive, at a first time, first downlink control information from a first transmission and reception point, the first downlink control information triggering transmission of a first sounding reference signal resource set, receive, at a second time, second downlink control information from a second transmission and reception point, the second downlink control information triggering transmission of a second sounding reference signal resource set, where the first time occurs before the second time, identify a reference slot for the first sounding reference signal resource set and the second sounding reference signal resource set, identify a timestamp as a last symbol of a control channel that includes the second downlink control information or a last symbol of a search space associated with the control channel that includes the second downlink control information, identify each of a first available slot for the first sounding reference signal resource set and a second available slot for the second sounding reference signal resource set based at least in part on a processing time after the timestamp, where the first available slot is offset from the reference slot by a first available slot offset and the second available slot is offset from the reference slot by a second available slot offset, and transmit the first sounding reference signal resource set in the first available slot and the second sounding reference signal resource set in the second available slot.

In some examples of the method, apparatuses, and non-transitory computer-readable medium described herein, identifying the first available slot for the first sounding reference signal resource set may include operations, features, means, or instructions for identifying the first available slot for the first sounding reference signal resource set from one or more candidate slots, where the timestamp may be determined based on receiving the first downlink control information and the second downlink control information.

Some examples of the method, apparatuses, and non-transitory computer-readable medium described herein may further include operations, features, means, or instructions for determining the reference slot to be a slot in which the second downlink control information may be received.

Some examples of the method, apparatuses, and non-transitory computer-readable medium described herein may further include operations, features, means, or instructions for receiving an indication of an offset in the second downlink control information and determining the reference slot based on the offset and a slot in which the second downlink control information may be received.

DETAILED DESCRIPTION

In some wireless communications systems, user equipment (UEs) may be configured to transmit sounding reference signal (SRS) resource sets to a base station. A UE may support periodic and aperiodic transmissions of SRS resource sets. To facilitate aperiodic transmissions of SRS resource sets, the base station may transmit downlink control information (DCI) to the UE to trigger transmissions of the SRS resource sets. In some cases, to improve reliability, a base station may transmit multiple DCI messages to the UE via at least one transmission and reception point (TRP), and each DCI message may trigger the UE to transmit at least one SRS resource set. In some other cases, the base station may transmit a single DCI message triggering the UE to transmit multiple SRS resource sets. In any case, it may be challenging for the UE to identify appropriate resources for transmitting the multiple SRS resource sets (e.g., to utilize resources efficiently and prevent conflicts).

As described herein, a wireless communications system may support efficient techniques at a UE for transmitting multiple SRS resource sets. In particular, the UE may use the techniques described herein to identify slots in which to transmit multiple SRS resource sets triggered by one or more DCI messages. In one aspect, the UE may determine a next available slot for transmitting an SRS resource set based on the available information at a timestamp and on a reference slot (e.g., the slot in which the latest DCI message is received or a slot that is offset from the slot in which the latest DCI message is received). In yet another aspect, the UE may receive one or more indications of slots in which to transmit the multiple SRS resource sets. In yet another aspect, the UE may follow one or more rules to identify slots in which to transmit the multiple SRS resource sets. In yet another aspect, the UE may support conflict resolution techniques to identify slots in which to transmit the multiple SRS resource sets when the UE is triggered to transmit multiple SRS resource sets in a same slot.

Aspects of the disclosure introduced above are described below in the context of a wireless communications system. Examples of processes and signaling exchanges that support multiple SRS transmissions triggered by DCI are then described. Aspects of the disclosure are further illustrated by and described with reference to apparatus diagrams, system diagrams, and flowcharts that relate to multiple SRS transmissions triggered by DCI.

Figure 1:
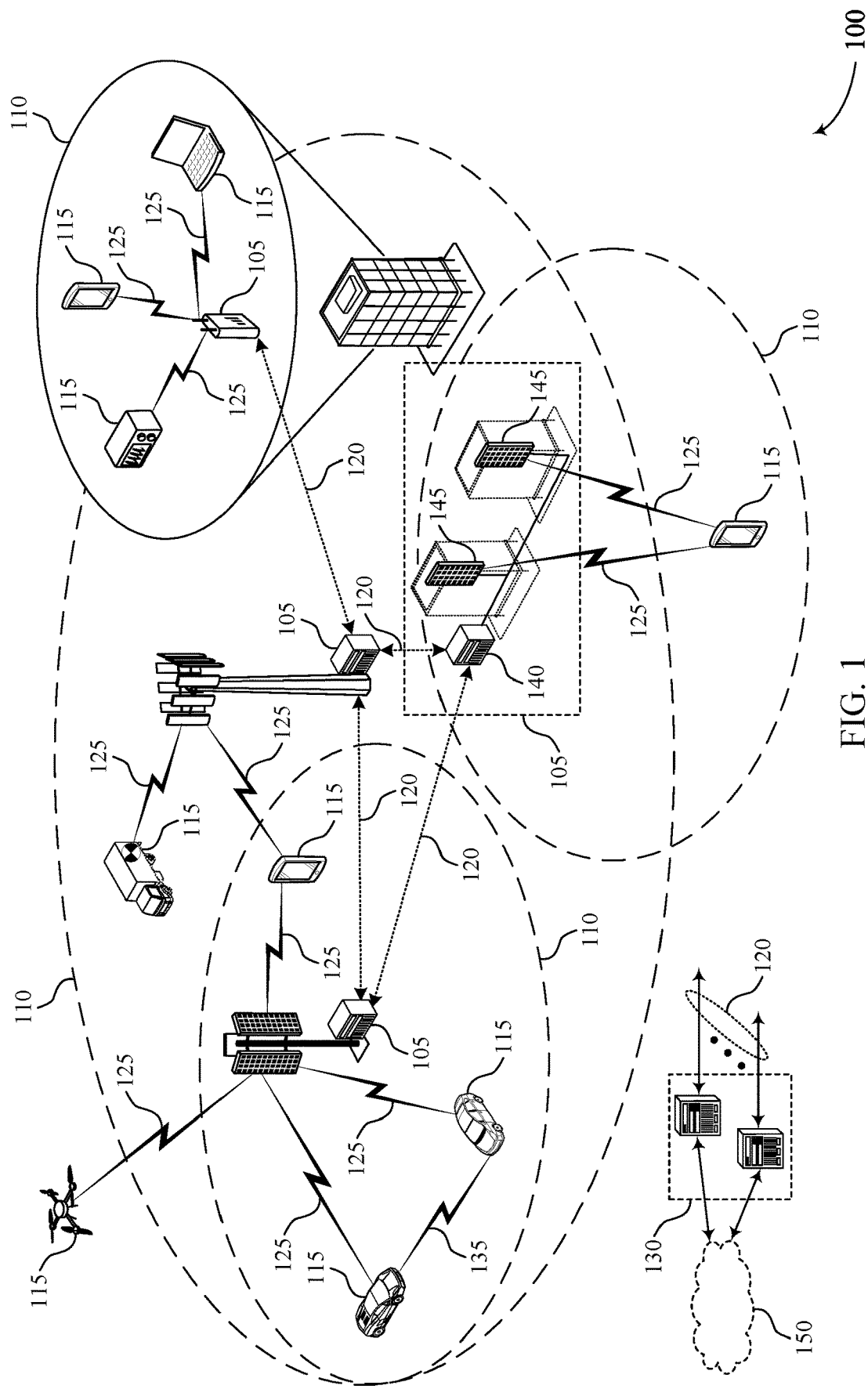
FIG. 1 illustrates an example of a wireless communications system that supports multiple sounding reference signal (SRS) transmissions triggered by downlink control information (DCI) in accordance with aspects of the present disclosure.

FIG. 1 illustrates an example of a wireless communications system 100 that supports multiple sounding reference signal transmissions triggered by downlink control information in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$)

and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In wireless communications system 100, UEs 115 may be configured to transmit SRS resource sets to base stations 105. A UE 115 may support periodic and aperiodic transmissions of SRS resource sets. To facilitate aperiodic transmissions of SRS resource sets, the base station 105 may transmit DCI to the UE 115 to trigger the transmissions of the SRS resource sets. The DCI may be referred to as triggering DCI, and the PDCCH carrying the DCI may be referred to as a triggering PDCCH. A given aperiodic SRS resource set may be transmitted in a (t+1)-th available slot counting from a reference slot (e.g., instead of using a fixed slot offset from the triggering DCI). A UE 115 may receive RRC signaling indicating one or more values of t for each SRS resource set, where the candidate values of t at least include zero. In some cases, the values of t associated with an SRS resource set may be updated. The value of t may then be indicated (e.g., explicitly or implicitly) in DCI (e.g., uplink or downlink DCI). Alternatively, the value of t may be indicated in RRC signaling (e.g., if only one value of t is configured in RRC). Further, the reference slot may be the slot that includes the DCI (e.g., triggering DCI), or the reference slot may be a slot that is offset from the slot that includes the DCI by an offset value (e.g., triggering offset) indicated in the DCI.

The definition of an available slot may consider UE processing complexity and a timeline to determine the available slot, potential co-existence with collision handling, etc. Based on only an RRC configuration, an available slot may refer to a slot that satisfies one or more conditions. A first condition may be that the slot includes uplink or flexible symbols in time-domain locations for all SRS resources in an SRS resource set. A second condition may be that the slot satisfies the minimum timing requirement between a triggering PDCCH and all the SRS resources in the SRS resource set.

Figure 2:
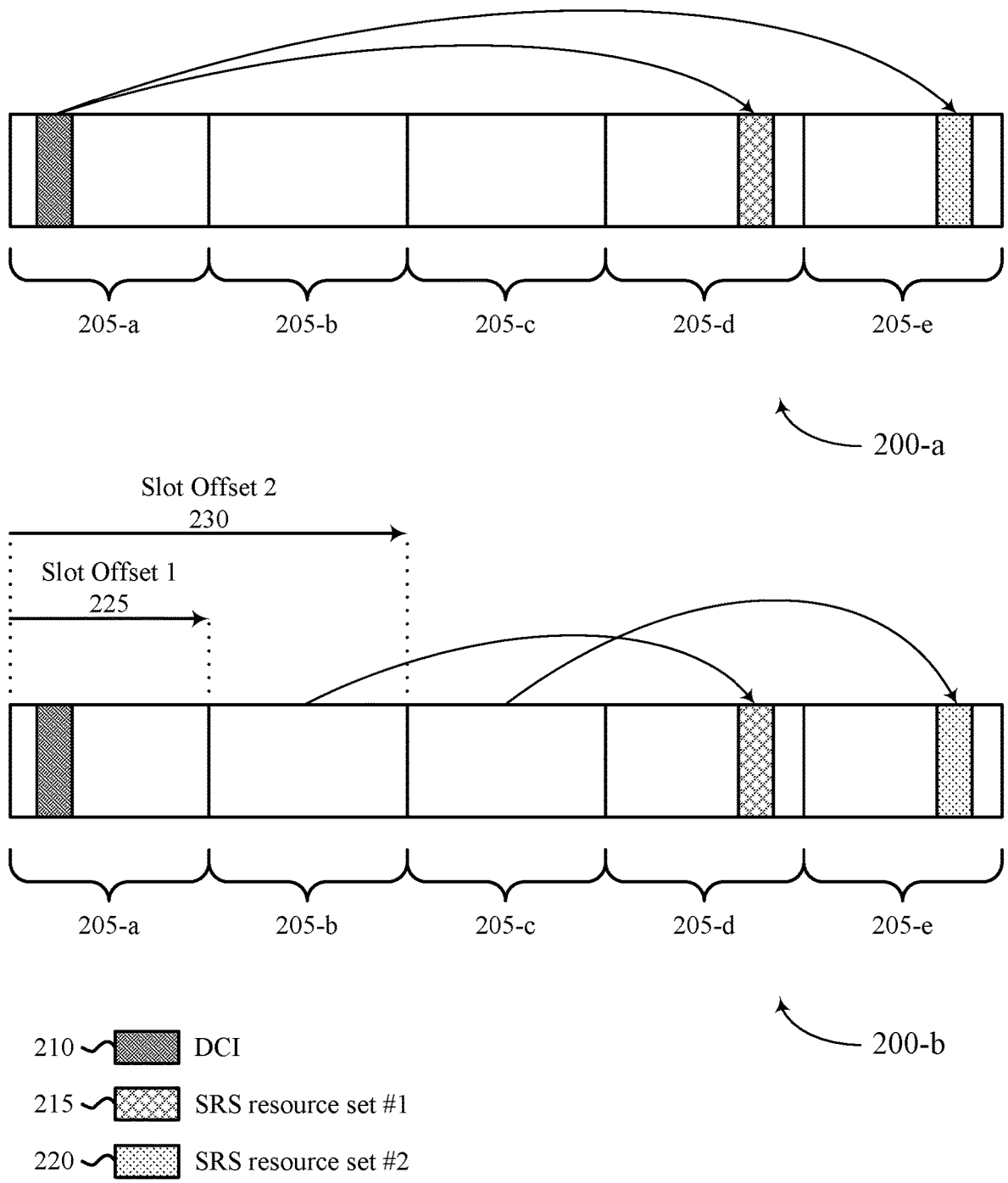
FIG. 2 illustrates multiple options for determining available slots for transmitting SRS resource sets.

FIG. 2 illustrates multiple options 200 for determining available slots for transmitting SRS resource sets. In FIG. 2, a first slot 205-*a* may be configured as downlink, a second slot 205-*b* may be configured as downlink, a third slot 205-*c* may be configured as downlink, a fourth slot 205-*d* may be configured as special, and a fifth slot 205-*e* may be configured as uplink. A base station 105 may transmit DCI 210 to a UE 115 triggering transmissions of two aperiodic SRS resource sets: SRS resource set 215 (e.g., SRS resource set #1) and SRS resource set 220 (e.g., SRS resource set #2). The base station 105 may also indicate (e.g., via DCI 210, RRC, or both) that t=0 for the SRS resource set 215 (e.g., the first SRS resource set) and t=1 for SRS resource set 220 (e.g., the second resource set), where t corresponds to the available slot for an SRS resource set.

In the first option 200-*a*, the reference slot may be the slot including the DCI 210 (e.g., slot 205-*a*). Thus, the UE 115 may transmit the SRS resource set 215 at the first (t=0) available slot, and the UE 115 may transmit the SRS resource set 220 at the second (t=1) available slot. Because the second slot 205-*b* and the third slot 205-*c* may be configured as downlink, the first available slot may be slot 205-*d*, and the second available slot may be slot 205-*e*. In the second option 200-*b*, the reference slot may be a slot offset from the slot including the DCI 210. The DCI 210 may indicate different offsets for reference slots for the different SRS resource sets. For instance, the slot offset 225 for the SRS resource set 215 may be one, and the slot offset 230 for the SRS resource set 220 may be two.

Thus, the reference slot for the SRS resource set 215 may be slot 205-*b*, and the reference slot for the SRS resource set 220 may be slot 205-*c*. Because the second slot 205-*b* and the third slot 205-*c* may be configured as downlink, the first available slot for SRS resource set 215 after the second slot 205-*b* (e.g., a reference slot) may be slot 205-*d*, and the second available slot for SRS resource set 220 after the third slot 205-*c* (e.g., a reference slot) may be slot 205-*e*. In some cases, only available slots may be counted when determining an available slot (e.g., based on the offset value t). Further, in some cases, the term 'first available slot' may refer to an available slot that is the first in time (e.g., with a value of t=0), and, in other cases, the term 'first available slot' may be used to differentiate from another available slot (e.g., a second or third available slot) and may refer to an available slot with any value of t.

In some cases, to improve reliability, a base station 105 may transmit multiple DCI messages to a UE 115 via multiple TRPs, and each DCI message may trigger the UE 115 to transmit at least one SRS resource set. That is, the base station 105 may utilize PDCCH repetition to increase reliability via multi-TRP. In some other cases, the base station 105 may transmit a single DCI message triggering the UE 115 to transmit multiple SRS resource sets. For instance, the single DCI may trigger two SRS resource sets for codebook and non-codebook. The UE 115 may then transmit the SRS resource sets to the base station 105.

In some aspects, when a UE 115 is triggered to transmit multiple SRS resource sets, it may be challenging for the UE 115 to identify appropriate resources for transmitting the multiple SRS resource sets (e.g., to utilize resources efficiently and prevent conflicts). Wireless communications system 100 may support efficient techniques at a UE 115 for transmitting multiple SRS resource sets. For instance, the techniques described herein may address the timeline of available slot determination when two PDCCHs are sent from two TRPs (e.g., for reliability). In addition, the techniques described herein may address DCI-based indication of available slots for multiple (e.g., two) aperiodic SRS resource sets. Further, the techniques described herein may provide rules for determining available slots for multiple (e.g., two or more) triggered SRS resource sets.

Figure 3:
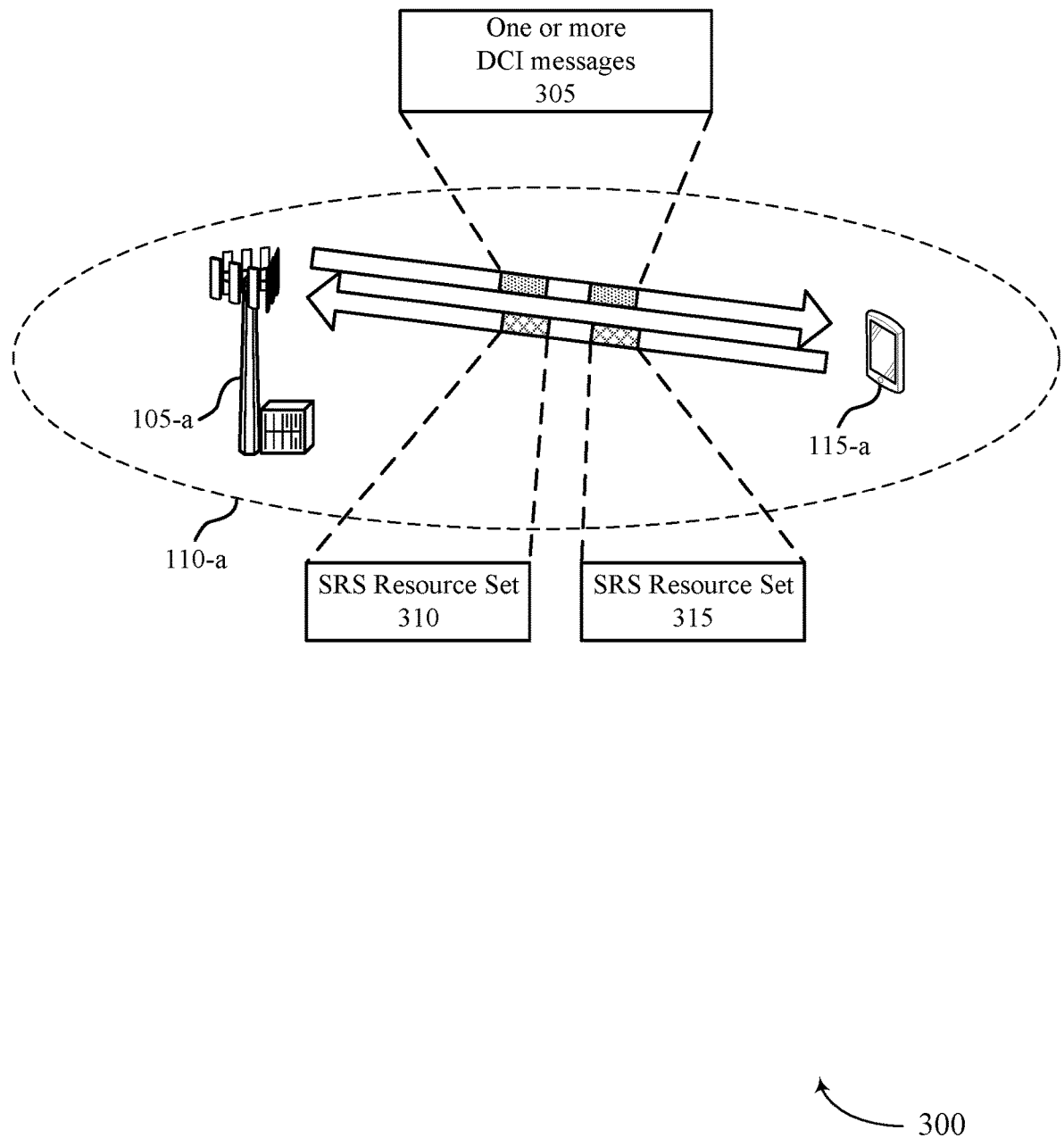
FIG. 3 illustrates an example of a wireless communications system that supports multiple SRS transmissions triggered by DCI in accordance with aspects of the present disclosure.

FIG. 3 illustrates an example of a wireless communications system 300 that supports multiple SRS transmissions triggered by DCI in accordance with aspects of the present disclosure. The wireless communications system 300 includes a UE 115-*a*, which may be an example of a UE 115 described with reference to FIGS. 1 and 2. The wireless communications system 300 also includes a base station 105-*a*, which may be an example of a base station 105 described with reference to FIGS. 1 and 2. The base station 105-*a* may provide communication coverage for a coverage area 110-*a*. The wireless communications system 300 may implement aspects of wireless communications system 100. For example, the wireless communications system 300 may support efficient techniques at the UE 115-*a* for transmitting multiple SRS resource sets.

The base station 105-*a* may transmit one or more DCI messages 305 to the UE 115-*a* triggering transmissions of multiple SRS resource sets from the UE 115-*a*, including the SRS resource set 310 and the SRS resource set 315. After receiving the one or more DCI messages 305, the UE 115-*a* may use the techniques described herein to identify slots in which to transmit the SRS resource set 310 and the SRS resource set 315. In one aspect, the UE 115-*a* may determine a next available slot for transmitting an SRS resource set (e.g., SRS resource set 310) based on the available information at a timestamp and based on a reference slot. The reference slot may be the slot in which the latest DCI message of the one or more DCI messages 305 is received or a slot that is offset from the slot in which the latest DCI message of the one or more DCI messages 305 is received. In yet another aspect, the UE 115-*a* may receive one or more indications of slots in which to transmit the multiple SRS resource sets. In yet another aspect, the UE 115-*a* may follow one or more rules to identify slots in which to transmit the multiple SRS resource sets. In yet another aspect, the UE 115-*a* may support conflict resolution techniques to identify slots in which to transmit the multiple SRS resource sets when the UE 115-*a* is triggered to transmit the multiple SRS resource sets in a same slot.

Figure 4:
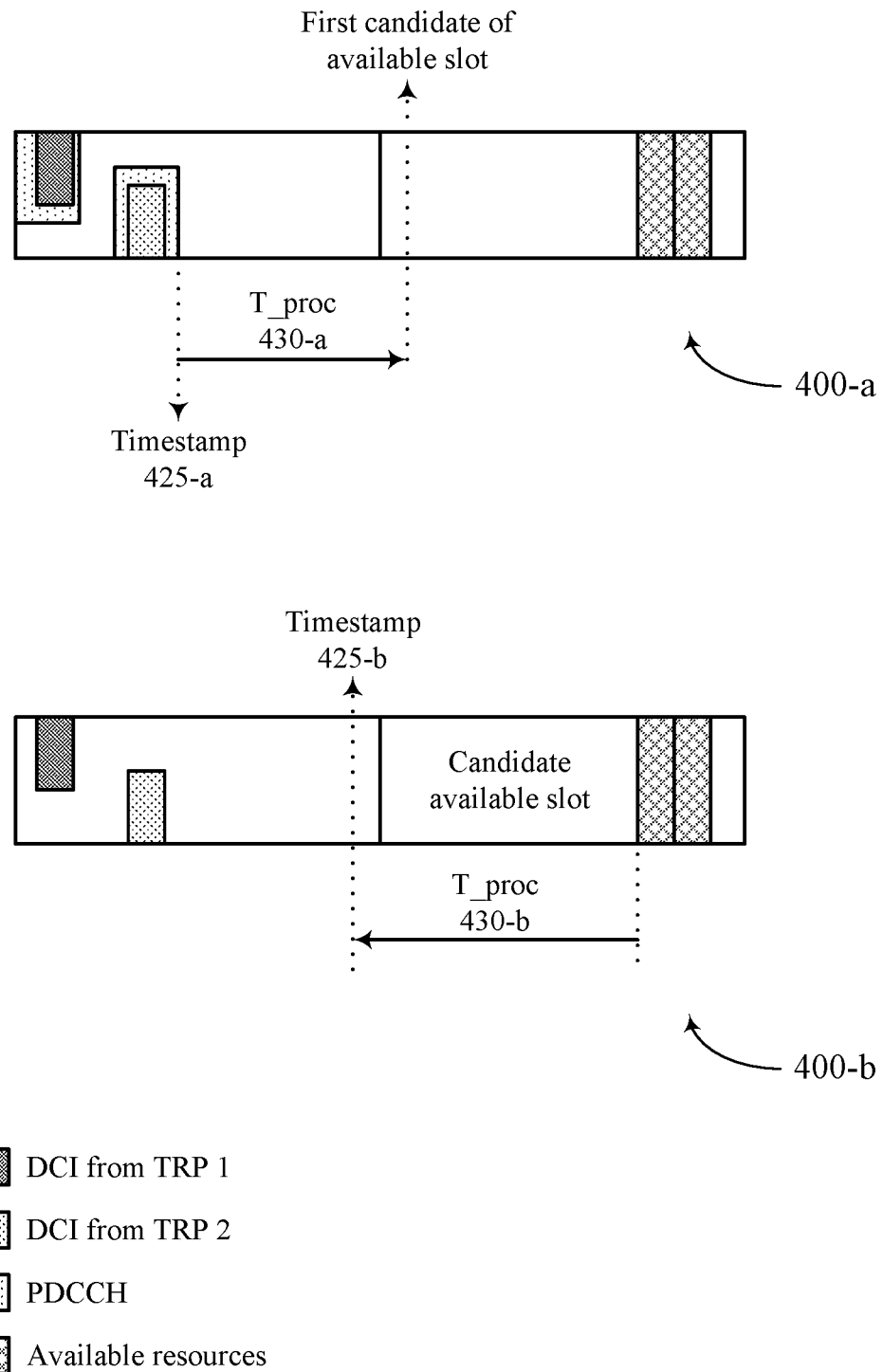
FIG. 4 illustrates multiple options for available slot determination with physical downlink control channel (PDCCH) repetition in accordance with aspects of the present disclosure.

FIG. 4 illustrates multiple options 400 for available slot determination with PDCCH repetition in accordance with aspects of the present disclosure. Each of the options 400 illustrate a single timestamp at which a UE 115 may determine a next available slot for transmitting an SRS resource set. The UE 115 may determine what is next available based on the available information at the single timestamp. In both options 400, a base station 105 may transmit, and a UE 115 may receive, a first DCI 405 from a first TRP triggering transmission of a first SRS resource set and a second DCI 410 from a second TRP triggering transmission of a second SRS resource set. In some cases, the first DCI 405 and the second DCI 410 may be the same (i.e., include the same payload), and the first DCI 405 and the second DCI 410 may both trigger transmission of the first SRS resource set and the second SRS resource set. The base station 105 may transmit, and the UE 115 may receive, each DCI in a PDCCH 415 (e.g., shown in option 400-*a*). The UE 115 may then identify available resources 420 in at least two slots to transmit the first SRS resource set and the second SRS resource set. Although FIG. 4 illustrates that the first DCI 405 and the second DCI 410 (e.g., in a first and second PDCCH, respectively) are received in a same slot, it is to be understood that the techniques described herein apply to scenarios where the first DCI 405 and the second DCI 410 are received in different slots (e.g., slot n and slot n+k).

In option 400-*a*, the timestamp 425-*a* may be a last symbol of a second PDCCH 415 (e.g., that includes the second DCI 410) or a last symbol of a search space associated with the second PDCCH (e.g., last symbol of a coreset that includes the second PDCCH). A UE 115 may then identify an available slot for transmitting an SRS resource set after a processing time 430-*a* (Tproc) following the timestamp. That is, the first candidate available slot may be a slot following the processing time (Tproc) after the timestamp. The processing time (Tproc) may refer to a minimum duration of time allocated for the UE 115 to process the second DCI 410 (e.g., the minimum processing timeline capability) and may be counted in terms of symbols. The processing time 430-*a* (Tproc) may be associated with a UE capability, or may be configured via RRC signaling.

In option 400-*b*, the timestamp 425-*b* may be a symbol preceding one or more symbols in a candidate available slot for the first SRS resource set (e.g., the available resources 420) by the processing time 430-*b* (Tproc). That is, the timestamp 425-*b* may precede the one or more symbols by the processing time 430-*b* (Tproc). The timestamp 425-*b* may be referred to as n-Tproc, where n is the time at which a UE 115 may start a transmission of a first symbol of a triggered transmission of an SRS resource set. The first symbol of the triggered transmission of the SRS resource set (e.g., the first symbol of the available resources 420) may be referred to as a start position and may be RRC configured per SRS resource. In some cases, the UE 115 may receive and correctly decode the second DCI 410 (e.g., in the second PDCCH) by the timestamp 425-*b*. In other cases, the UE 115 may receive and correctly decode at least one of the first DCI 405 or the second DCI 410 by the timestamp 425-*b*.

Figure 5:
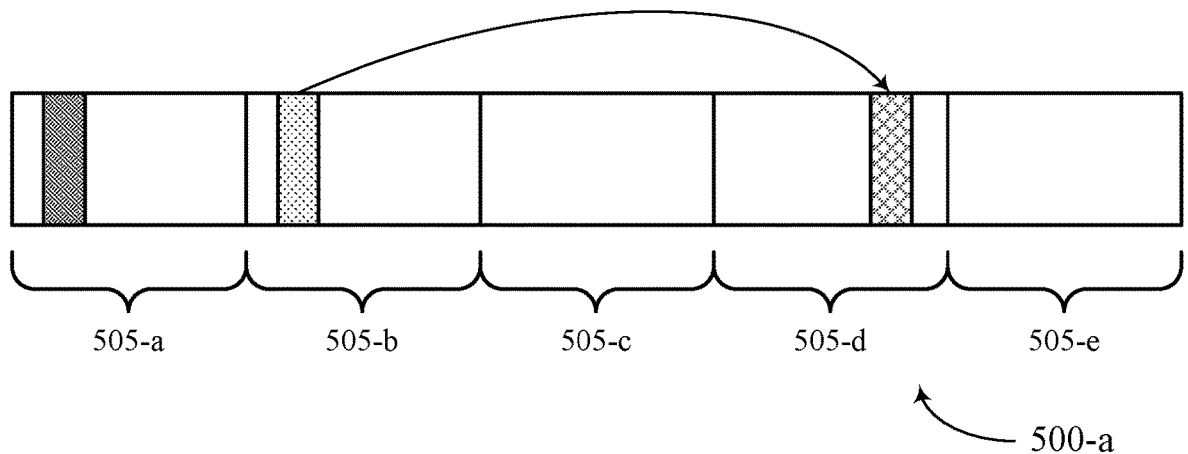
FIG. 5 illustrates multiple options for available slot determination with PDCCH repetition in accordance with aspects of the present disclosure.
Figure 5:
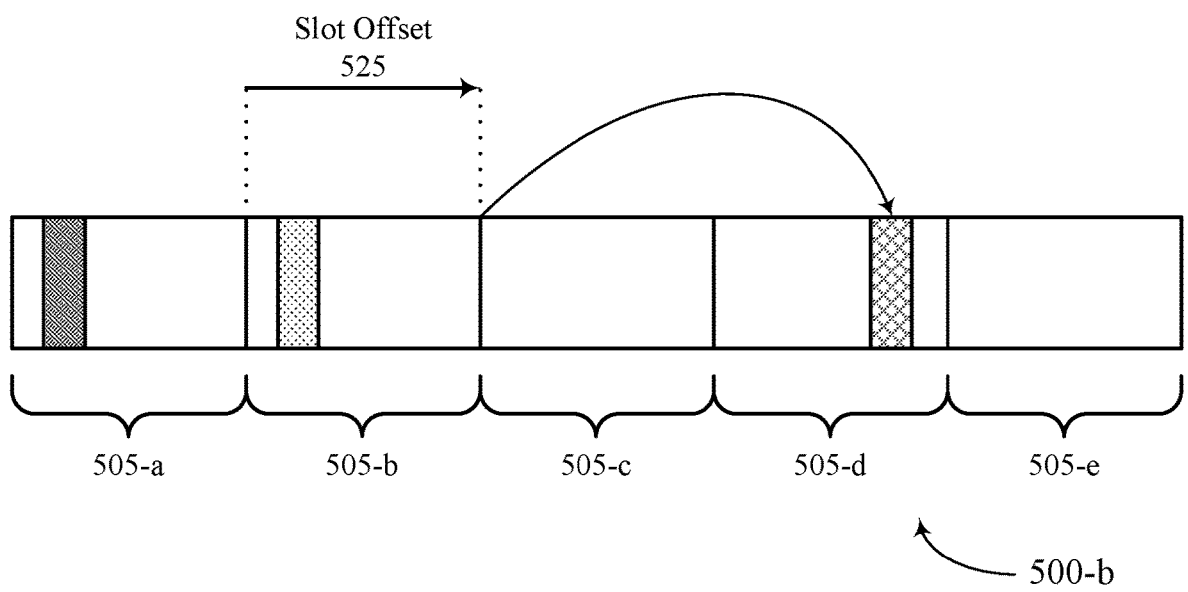

FIG. 5 illustrates multiple options 500 for available slot determination with PDCCH repetition in accordance with aspects of the present disclosure. In FIG. 5, a first slot 505-*a* may be configured as downlink, a second slot 505-*b* may be configured as downlink, a third slot 505-*c* may be configured as downlink, a fourth slot 505-*d* may be configured as special, and a fifth slot 505-*e* may be configured as uplink. A base station 105 may transmit first DCI 510 in a first slot 505-*a* triggering transmission of a first SRS resource set 520, and the base station 105 may transmit second DCI 515 in a second slot 505-*b* triggering transmission of a second SRS resource set. A UE 115 may receive the first DCI 510 and the second DCI 515 and identify appropriate slots in which to transmit the first SRS resource set 520 and the second SRS resource set.

The available slot determination at the UE 115 may be counted from a reference slot. Specifically, the first DCI 510 may include a first available slot offset for the first SRS resource set 520, and the second DCI 515 may include a second available slot offset for the second SRS resource set. The UE 115 may then identify an available slot for transmitting the first SRS resource set 520 based on the reference slot and the first available slot offset, where the available slot for the first SRS resource set 520 is offset from the reference slot by the first available slot offset (e.g., only counting available slots). Similarly, the UE 115 may identify an available slot for transmitting the second SRS resource set based on the reference slot and the second available slot offset, where the available slot for the second SRS resource set is offset from the reference slot by the second available slot offset (e.g., only counting available slots).

As mentioned above, the first available slot offset and the second available slot offset (i.e., an offset used to identify an available slot for transmitting an SRS resource set) may refer exclusively to available slots. Thus, the slot indicated by an offset (t) may be the t-th available slot following the reference slot instead of the t-th slot following the reference slot (e.g., as is the case for a fixed or absolute offset). Accordingly, the UE 115 may count available slots (e.g., rather than all slots) based on an offset to determine an available slot for transmitting an SRS resource set. That is, the UE 115 may determine the available slot for the SRS resource set based at least in part on the offset by counting available slots corresponding to the offset (e.g., where a quantity of available slots between a reference slot and the available slot for the SRS resource set is equal to the offset).

In both options 500-*a* and 500-*b*, the reference slot may be the same for the first SRS resource set and the second SRS resource set.

In option 500-*a*, the reference slot may be the slot in which the latest DCI (e.g., the second DCI 515) is received. That is, the reference slot may be based on the triggering DCI, and, for the case where the reference slot is based on the triggering DCI, the reference slot is the slot in which the second DCI 515 (e.g., in the second PDCCH) is received. Thus, the reference slot in option 500-*a* may be slot 505-*b*. Further, the DCI 510 may indicate a value of t=0 for the first SRS resource set. As such, because the slot 505-*c* may be configured as downlink, a UE 115 may determine that slot 505-*d* is the first available slot after the reference slot 505-*b*, and the UE 115 may transmit the SRS resource set 520 in the slot 505-*d*.

In option 500-*b*, the reference slot may be a slot offset from the slot in which the latest DCI (e.g., the second DCI 515) is received. The offset 525 between the slot in which the latest DCI is received and the reference slot may be indicated in the latest DCI. The offset 525 may be referred to as a triggering offset 525. That is, the reference slot may be based on a slot indicated by a triggering offset, and, for the case where the reference slot is based on a slot indicated by a triggering offset, the reference slot may be based on the triggering offset 525 determined from the latest DCI or PDCCH (e.g., the second DCI 515). The triggering offset 525 may be different from an offset (t) used to determine an available slot for an SRS resource set. The triggering offset 525 in option 500-b may be one, and, as a result, the reference slot may be slot 505-c (i.e., one slot after the slot in which the second DCI 515 is received). Further, the DCI 510 may indicate a value of t=0 for the first SRS resource set. As such, a UE 115 may determine that slot 505-d is the first available slot after the reference slot 505-c, and the UE 115 may transmit the SRS resource set 520 in the slot 505-d.

Figure 6:
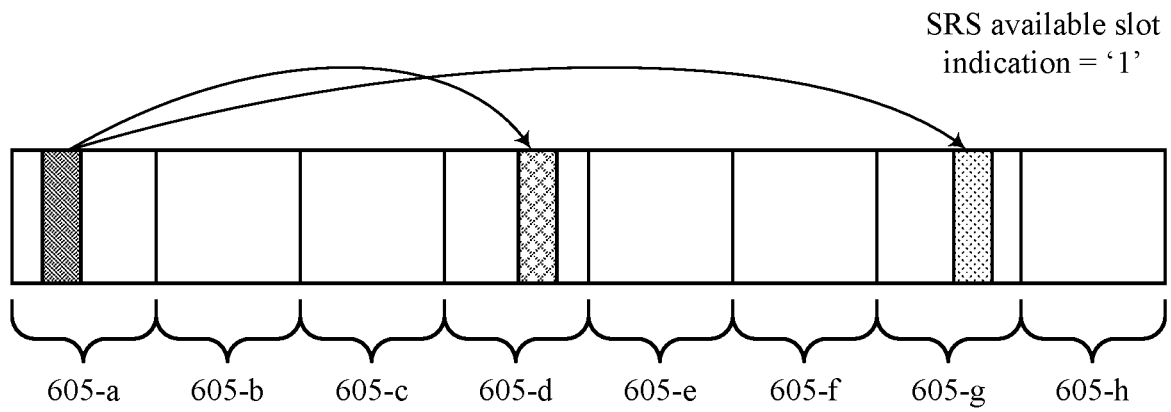
FIG. 6 illustrate examples of signaling used to indicate available slots for multiple SRS transmissions triggered by DCI in accordance with aspects of the present disclosure.
Figure 6:
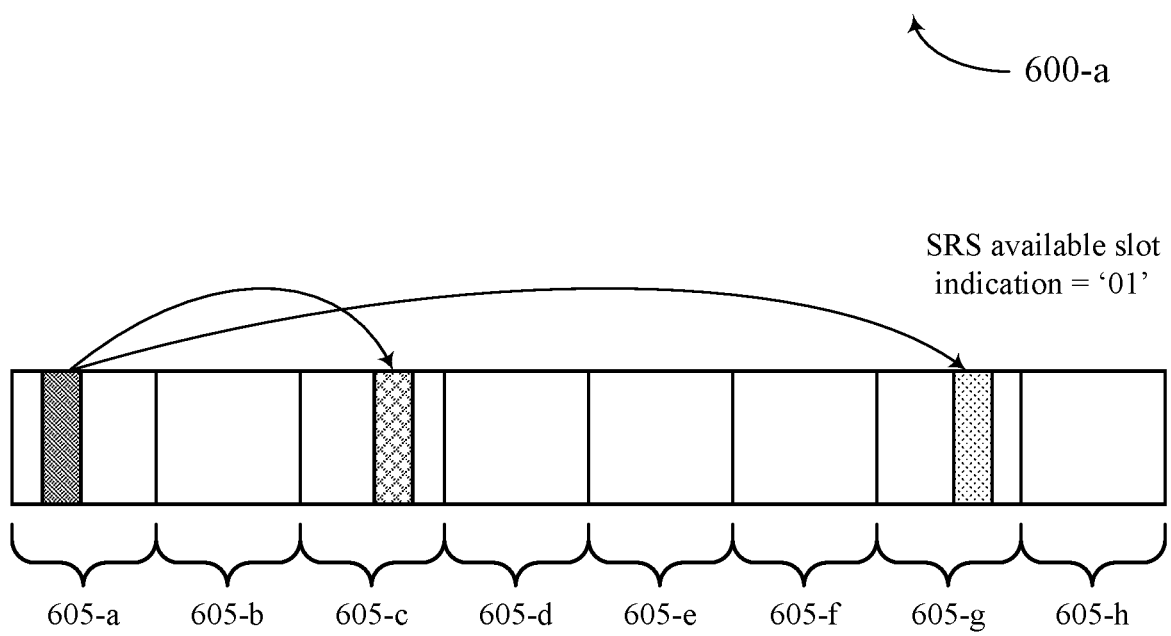

FIG. 6 illustrates an example of first signaling 600-a and second signaling 600-b used to indicate available slots for multiple SRS transmissions triggered by DCI in accordance with aspects of the present disclosure. In FIG. 6, a first slot 605-a may be configured as downlink (D), a second slot 605-b may be configured as downlink, a third slot 605-c may be configured as uplink (U), a fourth slot 605-d may be configured as flexible (F), a fifth slot 605-e may be configured as downlink, a sixth slot 605-f may be configured as downlink, a seventh slot 605-g may be configured as uplink, and an eight slot 605-h may be configured as flexible (e.g., following a DDUF half-slot format). A base station 105 may transmit DCI 610 triggering transmissions of multiple SRS resource sets, including a first SRS resource set 615 and a second SRS resource set 620. That is, a single DCI may trigger one or more SRS resource sets (e.g., regardless of the usage of the SRS resource sets). The multiple SRS resource sets may be two codebook-based SRS resource sets (e.g., for a codebook transmission), two non-codebook-based SRS resource sets (e.g., for a non-codebook-based transmission), two antenna-switching SRS resource sets, two beam management SRS resource sets, or any combination thereof.

In some cases, each SRS resource set may be RRC configured with one or more candidate available slots (e.g., a single candidate available slot (t value) or a list of candidate available slots (e.g., multiple t values)). For instance, a base station 105 may transmit an RRC message to a UE 115 indicating a trigger (e.g., aperiodic-SRS-ResourceTrigger) or trigger list (e.g., aperiodic-SRS-ResourceTriggerList) for each SRS resource set, where the trigger corresponds to a single candidate available slot (t value) and the trigger list corresponds to a list of candidate available slots (e.g., a list of t values). The base station 105 may then use DCI to indicate (or select) one of the candidate available slots (e.g., a t value). Table 1 below illustrates an example of values of an SRS request field included in DCI used to indicate which SRS resource sets are triggered. The candidate available slot for each triggered SRS set is indicated by a DCI bitfield (e.g., a slot offset indicator), as shown in Table 2.

TABLE 1

| | SRS request | |
|---|---|---|
| Value of SRS request field | Triggered aperiodic SRS resource set(s) for DCI format 0_1, 1_1, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
| 00 | No aperiodic SRS resource set triggered | No aperiodic SRS resource set triggered |
| 01 | SRS resource set(s) configured with higher layer parameter aperiodicSRS-ResourceTrigger set to 1 or | SRS resource set(s) configured with higher layer parameter usage in SRS-ResourceSet set to |

TABLE 1-continued

| | SRS request | |
|---|---|---|
| Value of SRS request field | Triggered aperiodic SRS resource set(s) for DCI format 0_1, 1_1, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
| | an entry in aperiodicSRS-ResourceTriggerList set to 1 | 'antennaSwitching' and resourceType in SRS-ResourceSet set to 'aperiodic' for a 1st set of serving cells configured by higher layers |
| 10 | SRS resource set(s) configured with higher layer parameter aperiodicSRS-ResourceTrigger set to 2 or an entry in aperiodicSRS-ResourceTriggerList set to 2 | SRS resource set(s) configured with higher layer parameter usage in SRS-ResourceSet set to 'antennaSwitching' and resourceType in SRS-ResourceSet set to 'aperiodic' for a 2nd set of serving cells configured by higher layers |
| 11 | SRS resource set(s) configured with higher layer parameter aperiodicSRS-ResourceTrigger set to 3 or an entry in aperiodicSRS-ResourceTriggerList set to 3 | SRS resource set(s) configured with higher layer parameter usage in SRS-ResourceSet set to 'antennaSwitching' and resourceType in SRS-ResourceSet set to 'aperiodic' for a 3rd set of serving cells configured by higher layers |

A base station 105 may include any of the values of the SRS request field in DCI to indicate an offset or t value corresponding to an available slot in which a UE 115 is to transmit an SRS resource set. In FIG. 6, however, a base station 105 may trigger transmissions of multiple SRS resource sets using a single DCI. The techniques described herein may allow the base station 105 to indicate, in DCI, available slots for transmitting the multiple SRS resource sets.

The base station 105 may first transmit, and the UE 115 may receive, an RRC message indicating a first trigger list for the first SRS resource set 615 and a second trigger list for the second SRS resource set 620. The first trigger list may include two offset values or values of t: t=0 and t=1, and the second trigger list may also include two offset values or values of t: t=0 and t=2. The base station 105 may then indicate, in DCI 610, a first available slot offset or t value from the first trigger list for the first SRS resource set 615, and a second available slot offset or t value from the second trigger list for the second SRS resource set 620. Table 2 below shows the correspondence between an indication in DCI and offset or t values.

TABLE 2

| DCI indications and offset or t values | | |
|---|---|---|
| Indication bit field (e.g., available slot offset indicator) | Available slot list of SRS resource set #1 | Available slot list of SRS resource set #2 |
| 0 | t = 0 | t = 0 |
| 1 | t = 1 | t = 2 |

In first signaling 600-*a*, a base station 105 may transmit, and a UE 115 may receive, DCI 610 including a same bit field or bit value used to indicate or select the available slots for all triggered SRS resource sets (e.g., SRS resource set 615 and SRS resource set 620). This option may be applicable to data scheduling DCIs (e.g., to limit overhead). In one example, the bit field or bit value may be one ('1'), and, according to Table 2, a bit field or bit value of one may correspond to t=1 for the first SRS resource set 615 and t=2 for the second SRS resource set 620. Thus, the UE 115 may transmit the first SRS resource set 615 in a second available slot, and the UE 115 may transmit the second SRS resource set 620 in a third available slot. Because slots 605-*a*, 605-*b*, 605-*e*, and 605-*f* are downlink slots, the first available slot may be slot 605-*c*, the second available slot may be slot 605-*d*, and the third available slot may be slot 605-*g*.

The same bit field used to indicate or select the available slots for all triggered SRS resource sets in the first signaling 600-*a* may be an explicit bit field or implicit bit field. One example of an implicit bit field may be based on an SRS request (e.g., an association between a triggering code and an available slot). In this example, the SRS request field in the DCI 610 used to trigger transmission of the first SRS resource set 615 and the second SRS resource set 620 may be linked to a bit field or bit value (e.g., one) corresponding to available slots for the first SRS resource set 615 and the second SRS resource set 620.

In second signaling 600-*b*, a base station 105 may transmit, and a UE 115 may receive, DCI 610 including multiple bit fields or bit values used to indicate or select the available slots for all triggered SRS resource sets (e.g., SRS resource set 615 and SRS resource set 620). This option may be applicable to non-scheduling DCIs (e.g., with DCI format 0_1 or 0_2), where some fields may be repurposed for the indication of an available slot per SRS resource set. Further, the order of bit fields or bit values may follow the indexes of the SRS resource sets (e.g., the SRS resource set identifiers (IDs)) based on some rule (e.g., ascending or descending order). For instance, a first bit field or bit value may correspond to an SRS resource set with a lowest index and a last bit field or bit value may correspond to an SRS resource set with a highest index, or vice versa.

In one example, the bit fields or bit values may be zero and one ('01'), and the first bit field or bit value may correspond to the first SRS resource set 615, while the second bit field or bit value may correspond to the second SRS resource set 620. According to Table 2, a bit field or bit value of zero for the first SRS resource set may correspond to t=0 for the first SRS resource set 615, and a bit field or bit value of one may correspond to t=2 for the second SRS resource set 620. Thus, the UE 115 may transmit the first SRS resource set 615 in a first available slot, and the UE 115 may transmit the second SRS resource set 620 in a third available slot. Because slots 605-*a*, 605-*b*, 605-*e*, and 605-*f* are downlink slots, the first available slot may be slot 605-*c*, the second available slot may be slot 605-*d*, and the third available slot may be slot 605-*g*.

Figure 7:
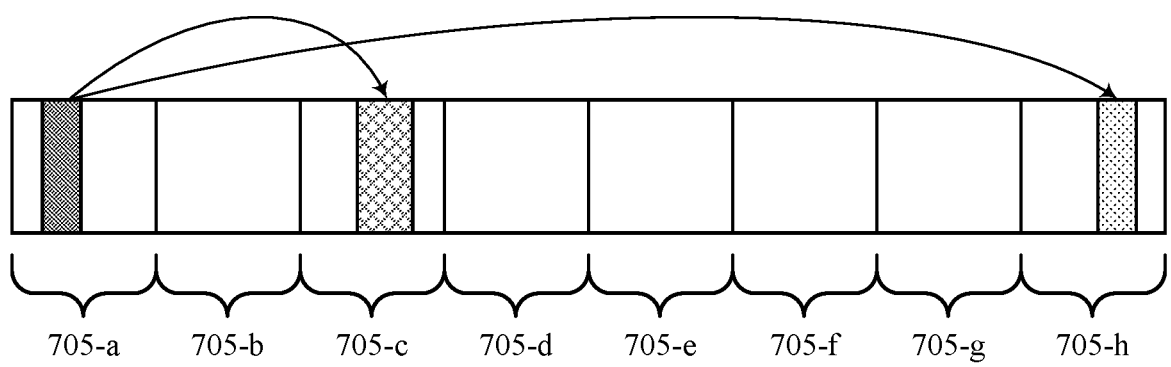
FIG. 7 illustrate examples of available slot determination for multiple SRS transmissions triggered by DCI in accordance with aspects of the present disclosure.
Figure 7:
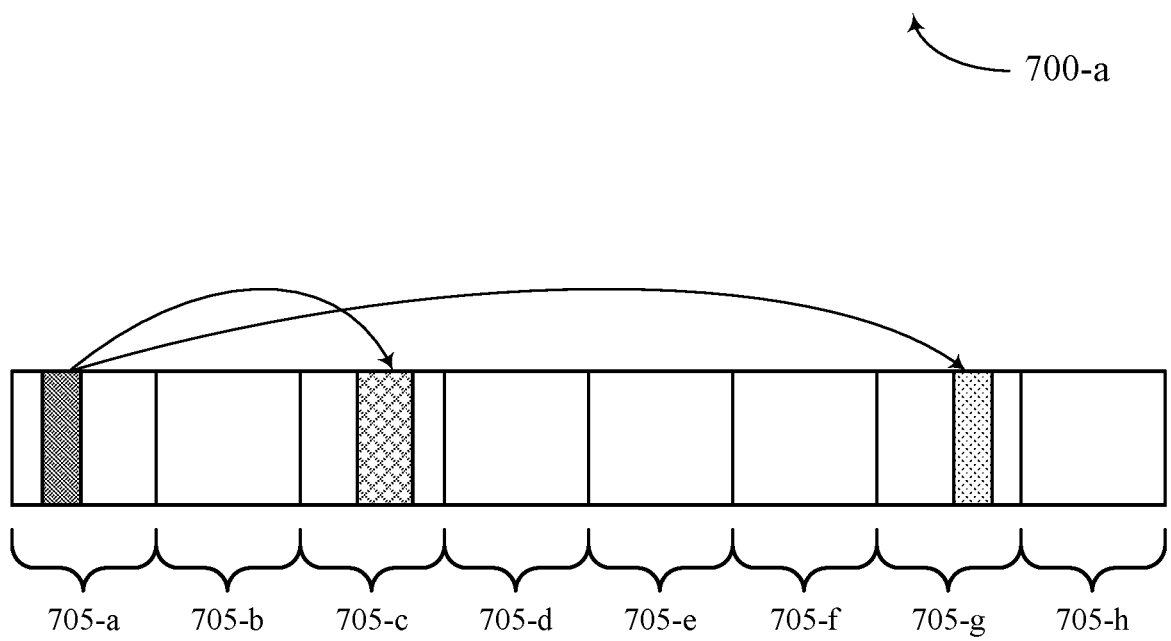

FIG. 7 illustrates an example of first available slot determination 700-*a* and second available slot determination 700-*b* for multiple SRS transmissions triggered by DCI in accordance with aspects of the present disclosure. In FIG. 7, a first slot 705-*a* may be configured as downlink, a second slot 705-*b* may be configured as downlink, a third slot 705-*c* may be configured as uplink, a fourth slot 705-*d* may be configured as flexible, a fifth slot 705-*e* may be configured as downlink, a sixth slot 705-*f* may be configured as downlink, a seventh slot 705-*g* may be configured as uplink, and an eight slot 705-*h* may be configured as flexible (e.g., following a DDUF slot format). A base station 105 may transmit DCI 710 to a UE 115 triggering transmissions of multiple SRS resource sets, including a first SRS resource set 715 and a second SRS resource set 720. That is, a single DCI may trigger one or more aperiodic SRS resource sets, where the SRS resource sets may or may not have overlapping time and frequency resources.

In addition to being triggered to transmit the first SRS resource set 715 and the second SRS resource set 720, the UE may receive an indication from the base station 105 of available slots in which to transmit the first SRS resource set 715 and the second SRS resource set 720. In particular, the base station 105 may transmit, and the UE 115 may receive, an indication of a first available slot offset corresponding to a first available slot for transmitting the first SRS resource set 715 and a second available slot offset corresponding to a second available slot for transmitting the second SRS resource set 720.

In some cases, it may be appropriate for the UE 115 to identify either the first available slot before the second available slot or identify the second available slot before the first available slot (e.g., when the SRS resource sets 715 and 720 have overlapping time or frequency allocations). Then, the UE 115 may identify the second available slot based on the first available slot being unavailable or identify the first available slot based on the second available slot being unavailable.

As described herein, the UE 115 may be configured with one or more rules to determine whether to identify the first available slot before the second available slot or the second available slot before the first available slot.

In one aspect, the UE 115 may determine an SRS resource set for which the UE 115 is to determine an available slot first based on an offset or t value associated with the SRS resource set. In particular, the UE 115 may determine an available slot first for an SRS resource set associated with a largest or smallest offset or t value. For instance, the DCI 710 may indicate an offset or t value for each of the first SRS resource set 715 and the second SRS resource set 720, and the UE 115 may determine an available slot for the SRS resource set with a largest or smallest offset or t value.

In another aspect, the UE 115 may determine an SRS resource set for which the UE 115 is to determine an available slot first based on an ID of the SRS resource set. In particular, the UE 115 may determine an available slot first for an SRS resource set with a largest or smallest ID.

In yet another aspect, the UE 115 may determine an SRS resource set for which the UE 115 is to determine an available slot first based on the usage of the SRS resource set. For instance, the UE 115 may determine an available slot first for an SRS resource set with a usage set to antenna switching, followed by an SRS resource set with a usage set to codebook, followed by an SRS resource set with a usage set to beam management, and followed by an SRS resource set with a usage set to non-codebook. The UE 115 may receive an indication of the usage of an SRS resource set in an RRC message from a base station 105.

In yet another aspect, the UE 115 may determine an SRS resource set for which the UE 115 is to determine an available slot first based on frequency resources allocated for transmitting the SRS resource set. For instance, the UE 115 may determine an available slot first for an SRS resource set scheduled to be transmitted on partial frequency resources, followed by an SRS resource set scheduled to be transmitted on a full set of frequency resources. The UE 115 may receive an indication of the allocation of frequency resources for an SRS resource set in DCI or in an RRC message.

In yet another aspect, the UE 115 may determine an SRS resource set for which the UE 115 is to determine an available slot first based on a configuration for the SRS resource set. The configuration of an SRS resource set may refer to a number of SRS resources in the SRS resource set, a transmit power configured for the SRS resource set, a frequency hopping configurations for the SRS resource set, a repetition configured for the SRS resource set, etc. Thus, as an example, the UE 115 may determine an available slot first for an SRS resource set with a least number of SRS resources, a highest transmit power, an enabled or disabled frequency hopping configuration, a largest or smallest number of repetitions configured. etc.

In yet another aspect, the UE 115 may not expect to be triggered (e.g., by a single DCI) to transmit multiple SRS resource sets (e.g., on overlapping time or frequency resources). Thus, if the UE 115 is triggered to transmit the multiple SRS resource sets (e.g., error case), the UE 115 may suppress transmission of the SRS resource sets (e.g., the UE 115 does not transmit any of the SRS resource sets).

As an example, the DCI 710 in FIG. 7 may indicate a first available slot offset or t value of zero for the first SRS resource set 715, and a second available slot offset or t value of two for the second SRS resource set 720.

In a first available slot determination 700-*a*, the UE 115 may determine to identify the available slot for the first SRS resource set 715 before the available slot for the second SRS resource set 720. Because slot 705-*b* may be configured as downlink, the UE 115 may determine that the available slot for the first SRS resource set 715 corresponding to the t value of zero is slot 705-*c*. Thus, the UE 115 may transmit the first SRS resource set 715 in the slot 705-*c*. Further, because slot 705-*c* may be considered unavailable and slots 705-*b*, 705-*e*, and 705-*f* may be configured as downlink, the UE 115 may determine that the available slot for the second SRS resource set 720 corresponding to the t value of two is slot 705-*h*. Thus, the UE 115 may transmit the second SRS resource set 720 in the slot 705-*h*.

In a second available slot determination 700-*b*, the UE 115 may determine to identify the available slot for the second SRS resource set 720 before the available slot for the first SRS resource set 715. Because slots 705-*b*, 705-*e*, and 705-*f* may be configured as downlink, the UE 115 may determine that the available slot for the second SRS resource set 720 corresponding to the t value of two is slot 705-*g*. Thus, the UE 115 may transmit the second SRS resource set 720 in slot 705-*g*. Further, because slot 705-*b* is configured as downlink, the UE 115 may determine that the available slot for the first SRS resource set 715 corresponding to the t value of zero is slot 705-*c*. Thus, the UE 115 may transmit the first SRS resource set 715 in the slot 705-*c*.

Figure 8:
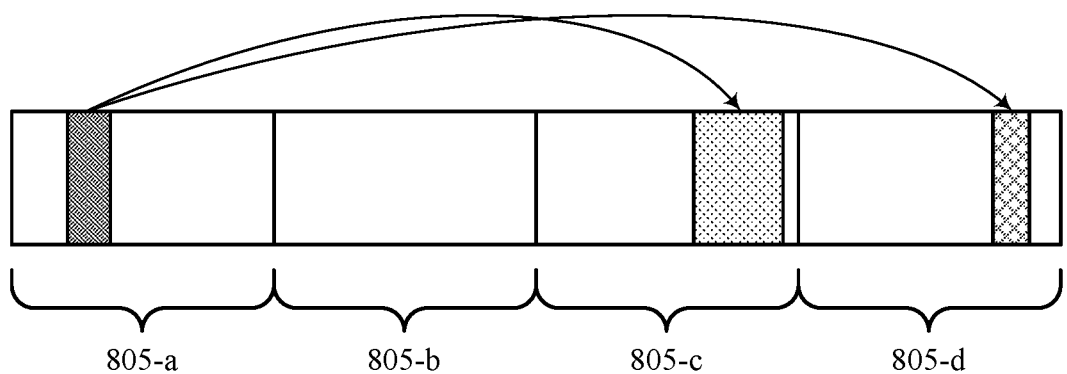
FIG. 8 illustrate examples of conflict resolution for multiple SRS transmissions triggered by DCI in accordance with aspects of the present disclosure.
Figure 8:
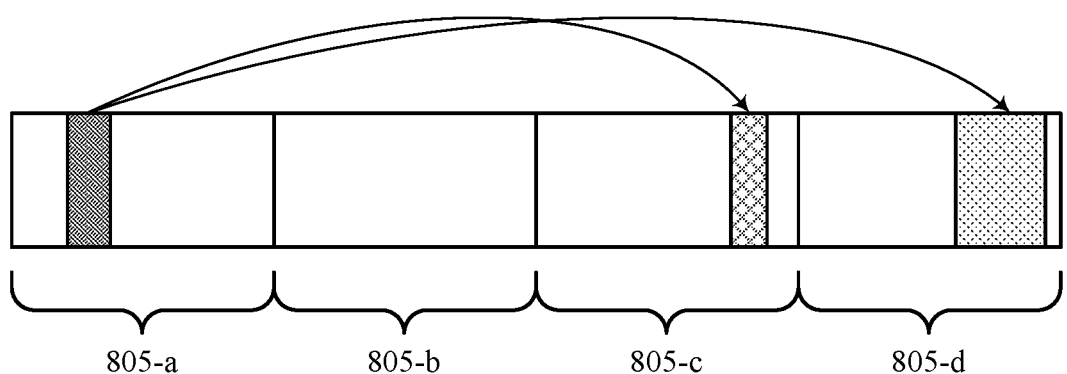

FIG. 8 illustrates an example of first conflict resolution 800-*a* and second conflict resolution 800-*b* for multiple SRS transmissions triggered by DCI in accordance with aspects of the present disclosure. In FIG. 8, a first slot 805-*a* may be configured as downlink, a second slot 805-*b* may be configured as downlink, a third slot 805-*c* may be configured as uplink, and a fourth slot 805-*d* may be configured as flexible (e.g., following a DDUF slot format). A base station 105 may transmit DCI 810 to a UE 115 triggering transmissions of multiple SRS resource sets, including a first SRS resource set 815 and a second SRS resource set 820. That is, a single DCI may trigger one or more aperiodic SRS resource sets.

In FIG. 8, a base station 105 may indicate a same indication or configuration of an available slot for the first SRS resource set 815 and the second SRS resource set 820. For instance, a single value of t=0 may be configured for both the first SRS resource set 815 and the second SRS resource set 820. As described herein, the UE 115 may be configured with one or more rules for conflict resolution to handle the case where the UE 115 is triggered to transmit multiple SRS resource sets (e.g., the first SRS resource set 815 and the second SRS resource set 820) in a same available slot.

In one aspect, the UE 115 may use different time-domain resources such that both the first SRS resource set 815 and the second SRS resource set 820 may be sent in the same available slot. In this aspect, it may be acceptable to have transmit power variation with back-to-back SRS symbols. That is, the UE 115 may be capable of transmitting the first SRS resource set 815 in a first subset of symbols in the same available slot and the second SRS resource set 820 in a second subset of symbols in the same available slot (e.g., with transmit power variation across the symbols used for different SRS resource sets).

In another aspect, the UE 115 may transmit either the first SRS resource set 815 or the second SRS resource set 820 in the same available slot, and the UE 115 may drop or postpone transmission of the other SRS resource set. That is, when the UE 115 is triggered to transmit the first SRS resource set 815 and the second SRS resource set 820 on overlapping time and frequency resources, only one of the SRS resource sets is transmitted on the overlapping time and frequency resources. The UE 115 may select the SRS resource set to transmit based on one or more rules.

In one example, the UE 115 may select the SRS resource set to transmit based on SRS usage configured for each SRS resource set (e.g., prioritizing transmitting SRS resource sets used for downlink channel state information (CSI) acquisition). In another example, the UE 115 may select the SRS resource set to transmit based on an SRS resource set ID for each SRS resource set. In yet another example, the UE 115 may select the SRS resource set to transmit based on a configuration for each SRS resource set (e.g., prioritizing transmitting SRS resource sets with the least number of SRS resources, highest transmit power, enabled or disabled frequency hopping configurations, largest or smallest number of repetitions, etc.).

In first conflict resolution 800-*a* and second conflict resolution 800-*b*, a UE 115 may be triggered to transmit the first SRS resource set 815 and the second SRS resource set 820 in a same available slot. For instance, the DCI 810 may indicate an offset or t value of zero for both the first SRS resource set 815 and the second SRS resource set 820 corresponding to slot 805-*c*. In the first conflict resolution 800-*a*, the UE 115 may transmit the second SRS resource set 820 in the slot 805-*c*, and the UE 115 may postpone transmission of the first SRS resource set to slot 805-*d*. In the second conflict resolution 800-*b*, the UE 115 may transmit the first SRS resource set 815 in the slot 805-*c*, and the UE 115 may postpone transmission of the second SRS resource set 820 to slot 805-*d*.

Figure 9:
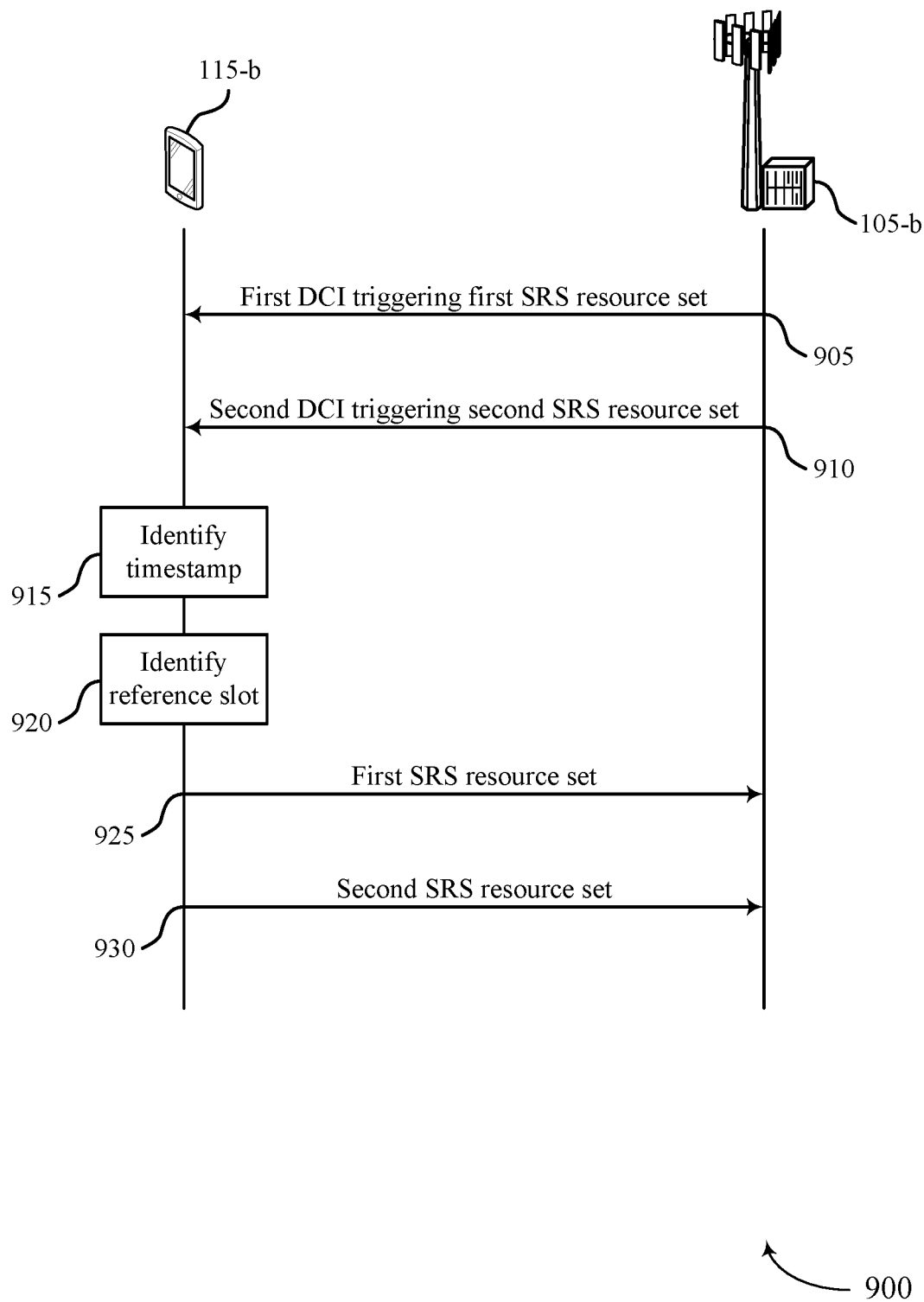
FIG. 9 illustrates an example of a process flow that supports multiple SRS transmissions triggered by DCI in accordance with aspects of the present disclosure.

FIG. 9 illustrates an example of a process flow 900 that supports multiple sounding reference signal transmissions triggered by downlink control information in accordance with aspects of the present disclosure. Process flow 900 includes a UE 115-*b*, which may be an example of a UE 115 described with reference to FIGS. 1-8. Process flow 900 also includes a base station 105-*b*, which may be an example of a base station 105 described with reference to FIGS. 1-8.

The process flow 900 may implement aspects of wireless communications system 300. For example, the process flow 900 may support efficient techniques at the UE 115-*b* for transmitting multiple SRS resource sets.

In the following description of the process flow 900, the signaling exchanged between the UE 115-*b* and the base station 105-*b* may be exchanged in a different order than the example order shown, or the operations performed by the UE 115-*b* and the base station 105-*b* may be performed in different orders or at different times. Some operations may also be omitted from the process flow 900, and other operations may be added to the process flow 900. Further, although process flow 900 and process flow 1000 depict some different signaling and operations, it is to be understood that the techniques described with reference to process flow 900 may be combined with the techniques described with reference to process flow 1000.

At 905, the base station 105-*b* may transmit, and the UE 115-*b* may receive, first DCI from a first TRP, the first DCI triggering transmission of a first SRS resource set. At 910, the base station 105-*b* may transmit, and the UE 115-*b* may receive, second DCI from a second TRP, the second DCI triggering transmission of a second SRS resource set. In some cases, the first DCI and the second DCI may be the same (e.g., including the same payload). In such cases, the first DCI and the second DCI may both trigger transmission of the first SRS resource set and the second SRS resource set. Further, the first DCI and the second DCI may include parameters for the UE 115-*b* to use to transmit the first SRS resource set and the second SRS resource set (e.g., a first available slot offset (t) for the first SRS resource set and a second available slot offset (t) for the second SRS resource set).

At 915, the UE 115-*b* may identify a timestamp at which to determine at least an available slot for transmitting the first SRS resource set (e.g., an available slot for the first SRS resource set and the second SRS set). In some cases, the UE 115-*b* may identify the timestamp as a last symbol of a control channel that includes the second DCI or a last symbol of a search space associated with the control channel that includes the second DCI. In such cases, the UE 115-*b* may identify a first available slot for the first SRS resource set from one or more candidate slots following a processing time after the timestamp. In other cases, the UE 115-*b* may identify the timestamp as a symbol preceding one or more symbols in a candidate slot available for the first SRS resource set by a processing time. In such cases, the UE 115-*b* may identify the first available slot for the first SRS resource set from one or more candidate slots following the timestamp. Further, the second DCI may be received and correctly decoded by the timestamp, or only the first DCI may be received and correctly decoded by the timestamp (e.g., the second DCI may be received and correctly decoded after the timestamp).

At 920, the UE 115-*b* may identify a reference slot for the first SRS resource set and the second SRS resource set. In some examples, the UE 115-*b* may determine the reference slot to be a slot in which the second DCI is received. In other examples, the UE 115-*b* may receive an indication of an offset in the second DCI, and the UE 115-*b* may determine the reference slot based on the offset and a slot in which the second DCI is received. The UE 115-*b* may then identify a first available slot for the first SRS resource set and a second available slot for the second SRS resource set, where the first available slot is offset from the reference slot by a first available slot offset indicated in the first DCI and the second available slot is offset from the reference slot by a second available slot offset indicated in the second DCI. At 925, the UE 115-*b* may transmit, and the base station 105-*b* may receive, the first SRS resource set in the first available slot, and, at 930, the UE 115-*b* may transmit, and the base station 105-*b* may receive, the second SRS resource set in the second available slot.

Figure 10:
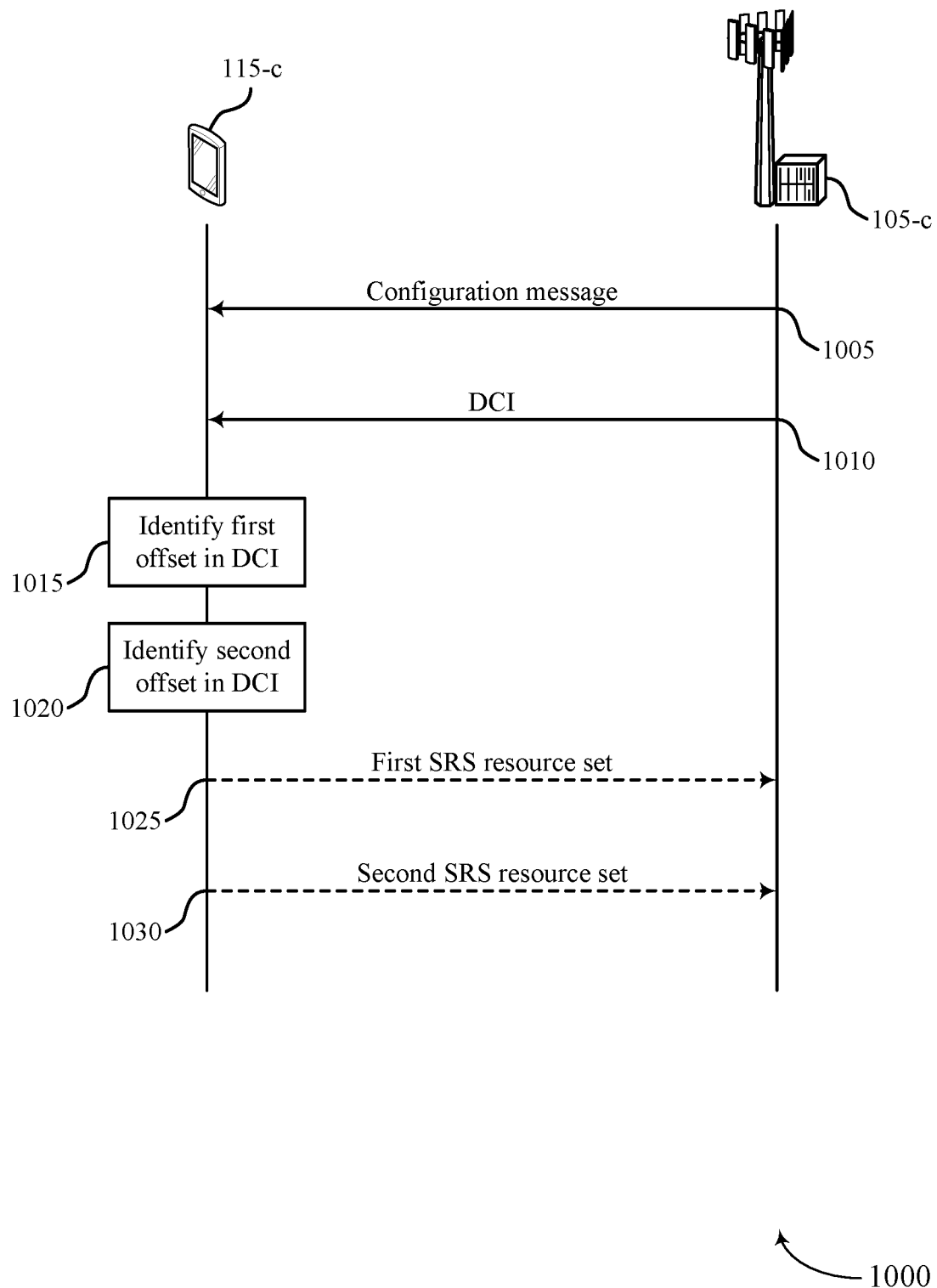
FIG. 10 illustrates an example of a process flow that supports multiple SRS transmissions triggered by DCI in accordance with aspects of the present disclosure.

FIG. 10 illustrates an example of a process flow 1000 that supports multiple sounding reference signal transmissions triggered by downlink control information in accordance with aspects of the present disclosure. Process flow 1000 includes a UE 115-*c*, which may be an example of a UE 115 described with reference to FIGS. 1-9. Process flow 1000 also includes a base station 105-*c*, which may be an example of a base station 105 described with reference to FIGS. 1-9. The process flow 1000 may implement aspects of wireless communications system 300. For example, the process flow 1000 may support efficient techniques at the UE 115-*c* for transmitting multiple SRS resource sets.

In the following description of the process flow 1000, the signaling exchanged between the UE 115-*c* and the base station 105-*c* may be exchanged in a different order than the example order shown, or the operations performed by the UE 115-*c* and the base station 105-*c* may be performed in different orders or at different times. Some operations may also be omitted from the process flow 1000, and other operations may be added to the process flow 1000. Further, although process flow 1000 and process flow 900 depict some different signaling and operations, it is to be understood that the techniques described with reference to process flow 1000 may be combined with the techniques described with reference to process flow 900.

At 1005, the base station 105-*c* may transmit, and the UE 115-*c* may receive, a configuration message (e.g., RRC message) indicating a first list of offsets for a first SRS resource set and a second list of offsets for a second SRS resource set. At 1010, the base station 105-*c* may then transmit, and the UE 115-*c* may receive, DCI triggering transmission of the first SRS resource set and the second SRS resource set. At 1015, the UE 115-*c* may identify, in the DCI, a first available slot offset from a reference slot to use to identify a first available slot for the first SRS resource set, and, at 1020, the UE 115-*c* may identify, in the DCI, a second available slot offset from the reference slot to use to identify a second available slot for the second SRS resource set.

Thus, the DCI may indicate the first available slot offset from the first list of offsets corresponding to the first available slot for the first SRS resource set and the second available slot offset from the second list of offsets corresponding to the second available slot for the second SRS resource set. In some cases, the base station 105-*c* may transmit, and the UE 115-*c* may receive, in the DCI, a bit field indicating the first available slot offset and the second available slot offset. In other cases, the base station 105-*c* may transmit, and the UE 115-*c* may receive, in the configuration message, a first list of triggering codes for triggering transmission of the first SRS resource set and a second list of triggering codes for triggering transmission of the second SRS resource set. Each triggering code in the first list may correspond to an offset for the first SRS resource set, and each triggering code in the second list may correspond to an offset for the second SRS resource set. Then, the base station 105-*c* may transmit, and the UE 115-*c* may receive, in the DCI, a triggering code from the first list of triggering codes triggering transmission of the first SRS resource set and indicating the first available slot offset and a triggering code from the second list of triggering codes triggering transmission of the second SRS resource set and indicating the second available slot offset. In yet other cases, the base station 105-c may transmit, and the UE 115-c may receive, a first bit field indicating the first available slot offset and a second bit field indicating the second available slot offset. In such cases, the UE 115-c may determine that the first bit field indicates the first available slot offset and the second bit field indicates the second available slot offset based on an order of the first bit field and the second bit field in the DCI.

In some aspects, the UE 115-c may identify the first available slot for the first SRS resource set before the second available slot for the second SRS resource set, and the UE 115-c may identify the second available slot for the second SRS resource set based on the first available slot being unavailable for the second SRS resource set. In such aspects, the UE 115-c may identify the first available slot before the second available slot based on the first available slot offset being greater than the second available slot offset. Additionally, or alternatively, the UE 115-c may identify the first available slot before the second available slot based on the first available slot offset being less than the second available slot offset. Additionally, or alternatively, the UE 115-c may identify the first available slot before the second available slot based on a first index of the first SRS resource set and a second index of the second SRS resource set.

Additionally, or alternatively, the UE 115-c may identify the first available slot before the second available slot based on a first usage of the first SRS resource set and a second usage of the second SRS resource set. Additionally, or alternatively, the UE 115-c may identify the first available slot before the second available slot based on the first SRS resource set being scheduled for transmission on partial frequency resources (e.g., and the second SRS resource set being scheduled for transmission on a full band of frequency resources). Additionally, or alternatively, the UE 115-c may identify the first available slot before the second available slot based on a first configuration of the first SRS resource set and a second configuration of the second SRS resource set, where the first configuration and the second configuration include a number of SRS resources, a transmit power, a frequency hopping configuration, or a number of repetitions for each SRS resource set.

At 1025, the UE 115-c may then transmit, and the base station 105-c may receive, the first SRS resource set in the first available slot, and, at 1030, the UE 115-c may transmit, and the base station 105-c may receive, the second SRS resource set in the second available slot. In some cases, however, the first available slot indicated for the first SRS resource set and the second available slot indicated for the second SRS resource slot may be the same slot. In such aspects, the UE 115-c may transmit the first SRS resource set on a first subset of symbols in the same slot, and the UE 115-c may transmit the second SRS resource set on a second subset of symbols in the same slot. Alternatively, the UE 115-c may transmit either the first SRS resource set or the second SRS resource set (e.g., and drop or postpone the other SRS resource set). The UE 115-c may determine whether to transmit the first SRS resource set or the second SRS resource set based on a first usage, index, or configuration of the first SRS resource set and a second usage, index, or configuration of the second SRS resource set.

Figure 11:
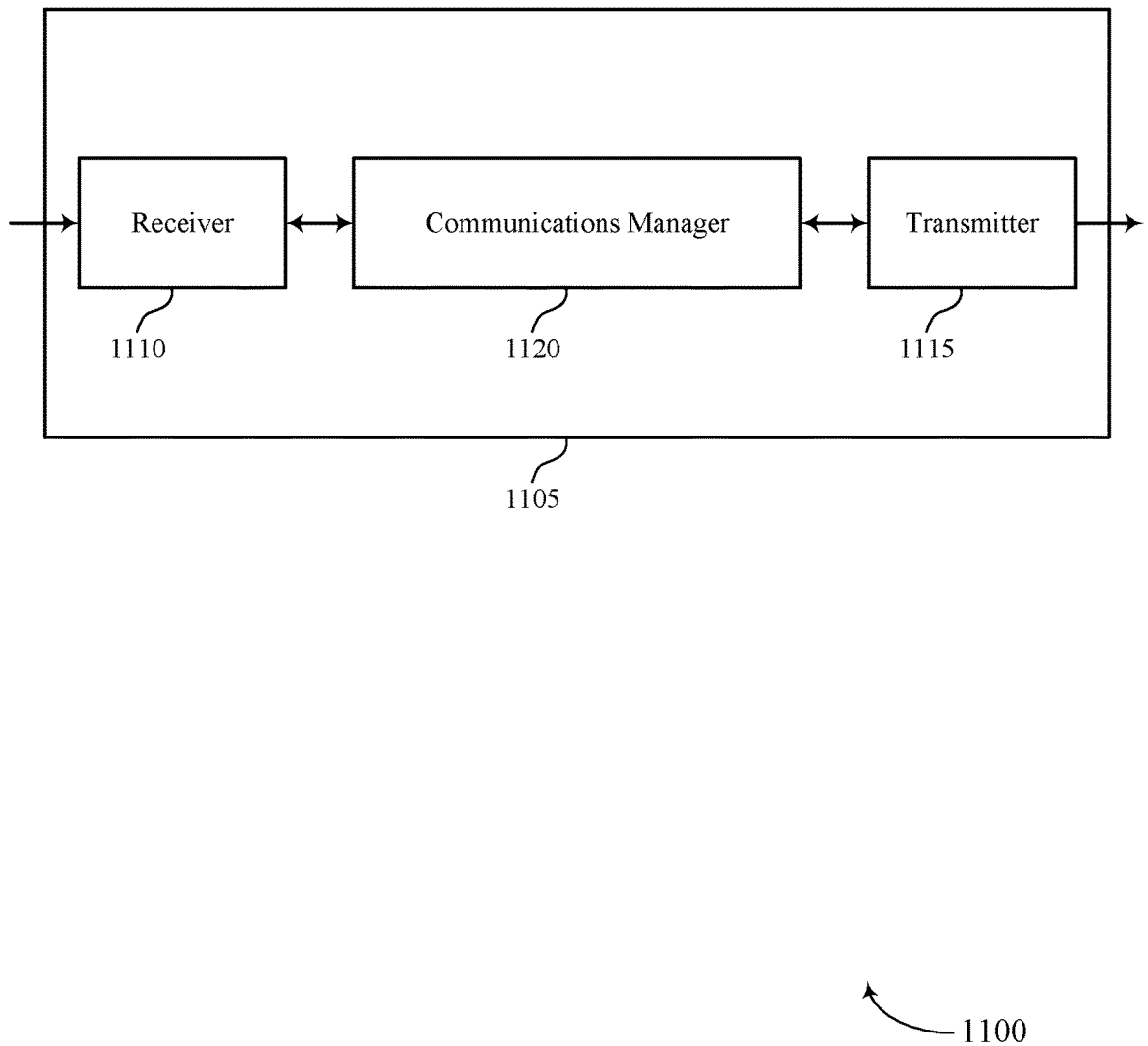
FIGS. 11 and 12 show block diagrams of devices that support multiple SRS transmissions triggered by DCI in accordance with aspects of the present disclosure.

FIG. 11 shows a block diagram 1100 of a device 1105 that supports multiple sounding reference signal transmissions triggered by downlink control information in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to multiple sounding reference signal transmissions triggered by downlink control information). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to multiple sounding reference signal transmissions triggered by downlink control information). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of multiple sounding reference signal transmissions triggered by downlink control information as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. For example, the communications manager 1120 may be configured as or otherwise support a means for receiving (e.g., at a first time) first downlink control information from a first transmission and reception point, the first downlink control information triggering transmission of a first sounding reference signal resource set. The communications manager 1120 may be configured as or otherwise support a means for receiving (e.g., at a second time different than the first time) second downlink control information from a second transmission and reception point, the second downlink control information triggering transmission of a second sounding reference signal resource set. The communications manager 1120 may be configured as or otherwise support a means for identifying a reference slot for the first sounding reference signal resource set and the second sounding reference signal resource set. The communications manager 1120 may be configured as or otherwise support a means for identifying a first available slot for the first sounding reference signal resource set and a second available slot for the second sounding reference signal resource set, where the first available slot is offset from the reference slot by a first available slot offset indicated in the first downlink control information and the second available slot is offset from the reference slot by a second available slot offset indicated in the second downlink control information. The communications manager 1120 may be configured as or otherwise support a means for transmitting the first sounding reference signal resource set in the first available slot and the second sounding reference signal resource set in the second available slot.

Additionally, or alternatively, the communications manager 1120 may support wireless communication at a UE in accordance with examples as disclosed herein. For example, the communications manager 1120 may be configured as or otherwise support a means for receiving a configuration message indicating a first list of offsets for a first sounding reference signal resource set and a second list of offsets for a second sounding reference signal resource set. The communications manager 1120 may be configured as or otherwise support a means for receiving downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set. The communications manager 1120 may be configured as or otherwise support a means for transmitting the first sounding reference signal resource set in the first available slot, the second sounding reference signal resource set in the second available slot, or both.

By including or configuring the communications manager 1120 in accordance with examples as described herein, the device 1105 (e.g., a processor controlling or otherwise coupled to the receiver 1110, the transmitter 1115, the communications manager 1120, or any combination thereof) may support techniques for more efficient utilization of communication resources. In particular, a UE may be able to efficiently identify resources on which to transmit SRSs to a base station, and the base station may use the SRSs to efficiently schedule communications with the UE. Such efficient scheduling may result in improved communication reliability, reduced latency, reduced power consumption, and improved utilization of processing capability.

Figure 12:
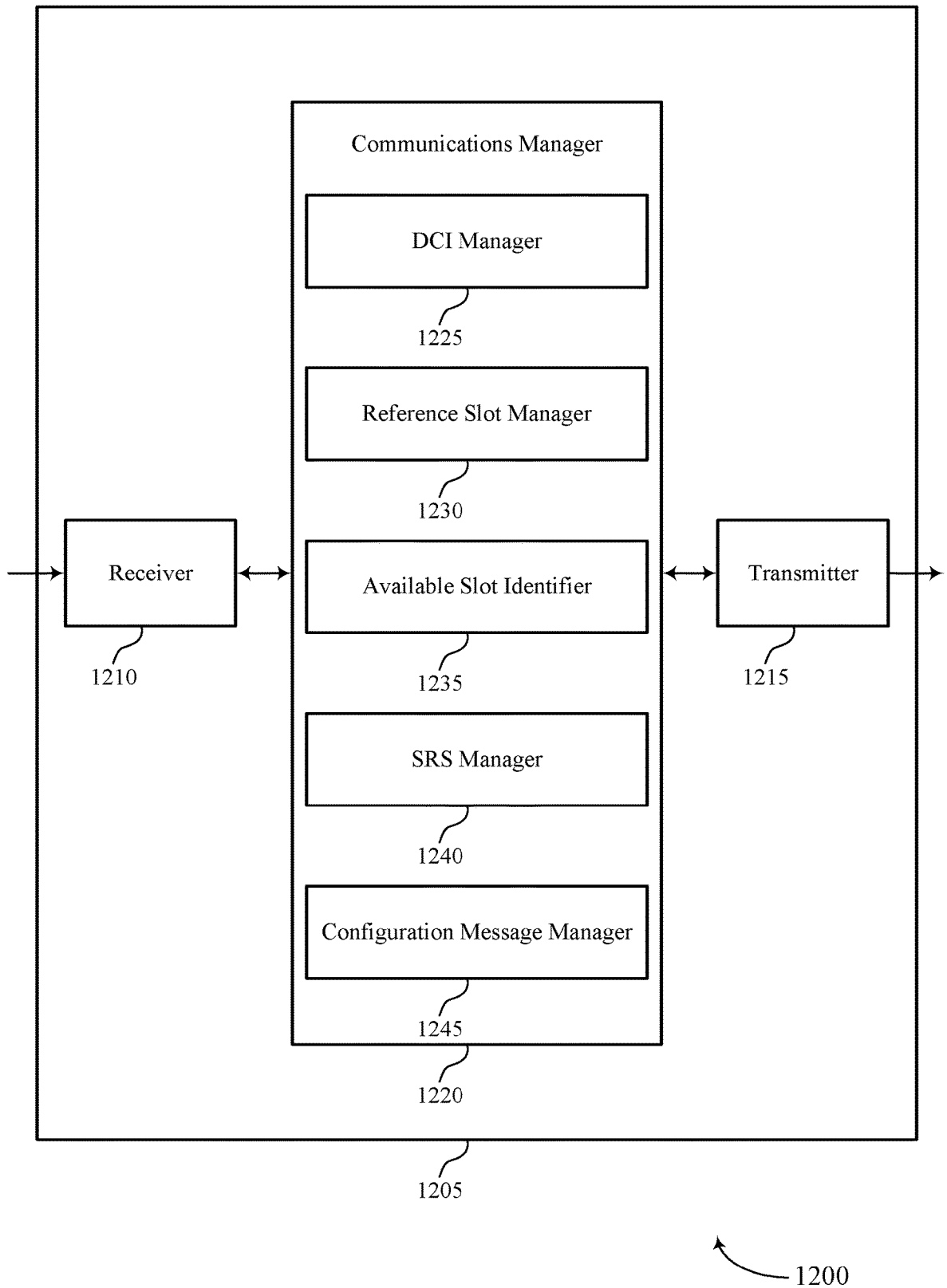

FIG. 12 shows a block diagram 1200 of a device 1205 that supports multiple sounding reference signal transmissions triggered by downlink control information in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to multiple sounding reference signal transmissions triggered by downlink control information). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to multiple sounding reference signal transmissions triggered by downlink control information). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of multiple sounding reference signal transmissions triggered by downlink control information as described herein. For example, the communications manager 1220 may include a DCI manager 1225, a reference slot manager 1230, an available slot identifier 1235, an SRS manager 1240, a configuration message manager 1245, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a UE in accordance with examples as disclosed herein. The DCI manager 1225 may be configured as or otherwise support a means for receiving (e.g., at a first time) first downlink control information from a first transmission and reception point, the first downlink control information triggering transmission of a first sounding reference signal resource set. The DCI manager 1225 may be configured as or otherwise support a means for receiving (e.g., at a second time different than the first time) second downlink control information from a second transmission and reception point, the second downlink control information triggering transmission of a second sounding reference signal resource set. The reference slot manager 1230 may be configured as or otherwise support a means for identifying a reference slot for the first sounding reference signal resource set and the second sounding reference signal resource set. The available slot identifier 1235 may be configured as or otherwise support a means for identifying a first available slot for the first sounding reference signal resource set and a second available slot for the second sounding reference signal resource set, where the first available slot is offset from the reference slot by a first available slot offset indicated in the first downlink control information and the second available slot is offset from the reference slot by a second available slot offset indicated in the second downlink control information. The SRS manager 1240 may be configured as or otherwise support a means for transmitting the first sounding reference signal resource set in the first available slot and the second sounding reference signal resource set in the second available slot.

Additionally, or alternatively, the communications manager 1220 may support wireless communication at a UE in accordance with examples as disclosed herein. The configuration message manager 1245 may be configured as or otherwise support a means for receiving a configuration message indicating a first list of offsets for a first sounding reference signal resource set and a second list of offsets for a second sounding reference signal resource set. The DCI manager 1225 may be configured as or otherwise support a means for receiving downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set. The SRS manager 1240 may be configured as or otherwise support a means for transmitting the first sounding reference signal resource set in the first available slot, the second sounding reference signal resource set in the second available slot, or both.

Figure 13:
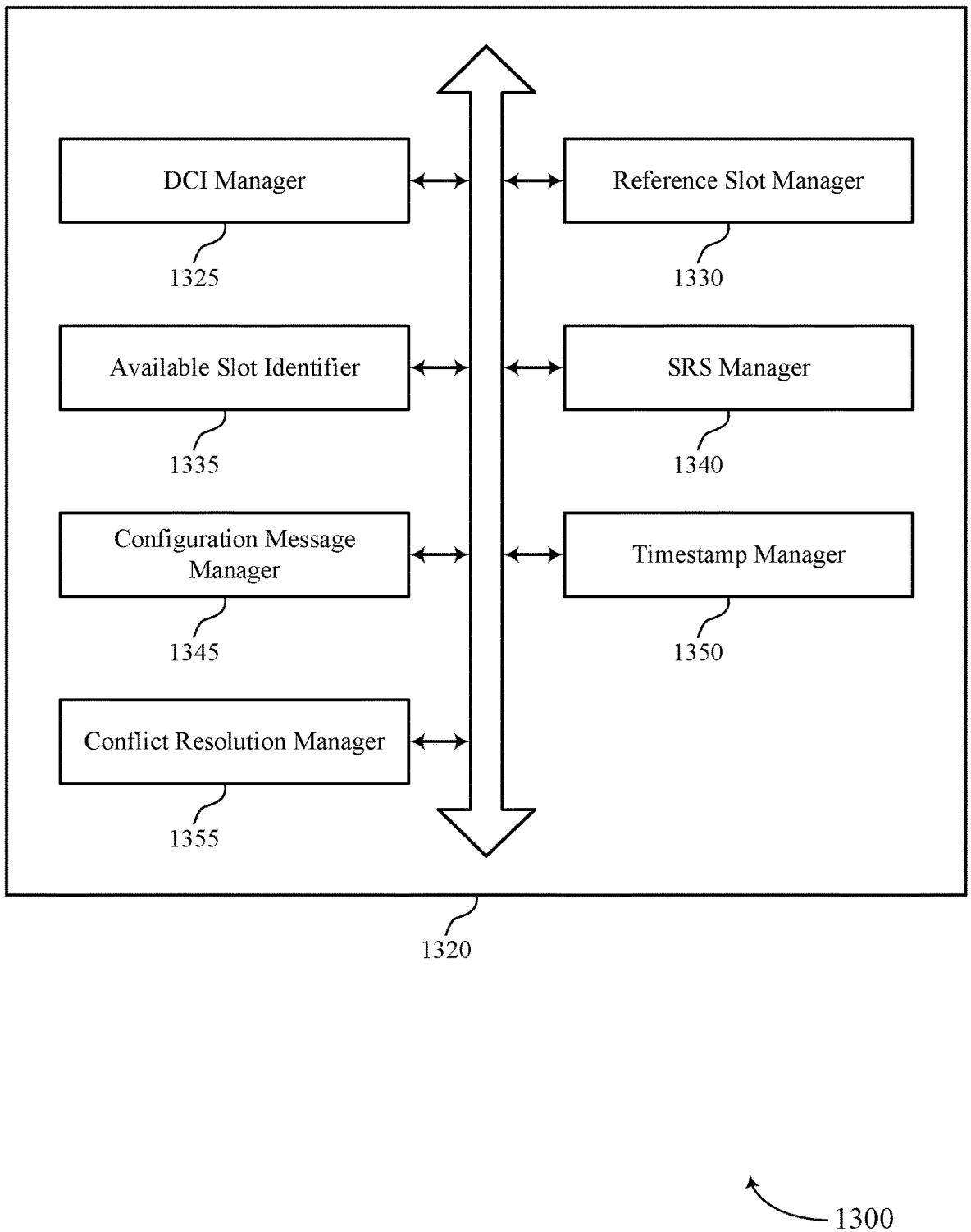
FIG. 13 shows a block diagram of a communications manager that supports multiple SRS transmissions triggered by DCI in accordance with aspects of the present disclosure.

FIG. 13 shows a block diagram 1300 of a communications manager 1320 that supports multiple sounding reference signal transmissions triggered by downlink control information in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of multiple sounding reference signal transmissions triggered by downlink control information as described herein. For example, the communications manager 1320 may include a DCI manager 1325, a reference slot manager 1330, an available slot identifier 1335, an SRS manager 1340, a configuration message manager 1345, a timestamp manager 1350, a conflict resolution manager 1355, or any combination thereof. Each of these components may communicate, directly or indirectly, with one another (e.g., via one or more buses).

The communications manager 1320 may support wireless communication at a UE in accordance with examples as disclosed herein. The DCI manager 1325 may be configured as or otherwise support a means for receiving (e.g., at a first time) first downlink control information from a first transmission and reception point, the first downlink control information triggering transmission of a first sounding reference signal resource set. In some examples, the DCI manager 1325 may be configured as or otherwise support a means for receiving (e.g., at a second time different than the first time) second downlink control information from a second transmission and reception point, the second downlink control information triggering transmission of a second sounding reference signal resource set. The reference slot manager 1330 may be configured as or otherwise support a means for identifying a reference slot for the first sounding reference signal resource set and the second sounding reference signal resource set. The available slot identifier 1335 may be configured as or otherwise support a means for identifying a first available slot for the first sounding reference signal resource set and a second available slot for the second sounding reference signal resource set, where the first available slot is offset from the reference slot by a first available slot offset indicated in the first downlink control information and the second available slot is offset from the reference slot by a second available slot offset indicated in the second downlink control information. The SRS manager 1340 may be configured as or otherwise support a means for transmitting the first sounding reference signal resource set in the first available slot and the second sounding reference signal resource set in the second available slot.

In some examples, to support identifying the first available slot for the first sounding reference signal resource set, the available slot identifier 1335 may be configured as or otherwise support a means for identifying the first available slot for the first sounding reference signal resource set from one or more candidate slots following a processing time after a timestamp determined based on receiving the first downlink control information and the second downlink control information. In some examples, the timestamp manager 1350 may be configured as or otherwise support a means for identifying the timestamp as a last symbol of a control channel that includes the second downlink control information or a last symbol of a search space associated with the control channel that includes the second downlink control information.

In some examples, to support identifying the first available slot for the first sounding reference signal resource set, the available slot identifier 1335 may be configured as or otherwise support a means for identifying the first available slot for the first sounding reference signal resource set from one or more candidate slots following a timestamp determined based on receiving the first downlink control information and the second downlink control information. In some examples, the timestamp manager 1350 may be configured as or otherwise support a means for identifying the timestamp as a symbol preceding one or more symbols in a candidate slot available for the first sounding reference signal resource set by a processing time. In some examples, the second downlink control information is received and correctly decoded by the timestamp. In some examples, at least one of the first downlink control information or the second downlink control information is received and correctly decoded by the timestamp.

In some examples, the reference slot manager 1330 may be configured as or otherwise support a means for determining the reference slot to be a slot in which the second downlink control information is received. In some examples, the reference slot manager 1330 may be configured as or otherwise support a means for receiving an indication of an offset in the second downlink control information. In some examples, the reference slot manager 1330 may be configured as or otherwise support a means for determining the reference slot based on the offset and a slot in which the second downlink control information is received.

Additionally, or alternatively, the communications manager 1320 may support wireless communication at a UE in accordance with examples as disclosed herein. The configuration message manager 1345 may be configured as or otherwise support a means for receiving a configuration message indicating a first list of offsets for a first sounding reference signal resource set and a second list of offsets for a second sounding reference signal resource set. In some examples, the DCI manager 1325 may be configured as or otherwise support a means for receiving downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set. In some examples, the SRS manager 1340 may be configured as or otherwise support a means for transmitting the first sounding reference signal resource set in the first available slot, the second sounding reference signal resource set in the second available slot, or both.

In some examples, the available slot identifier 1335 may be configured as or otherwise support a means for receiving, in the downlink control information, a bit field indicating the first available slot offset and the second available slot offset. In some examples, the configuration message manager 1345 may be configured as or otherwise support a means for receiving, in the configuration message, a first list of triggering codes for triggering transmission of the first sounding reference signal resource set, where each triggering code in the first list corresponds to an offset for the first sounding reference signal resource set. In some examples, the available slot identifier 1335 may be configured as or otherwise support a means for receiving, in the downlink control information, a triggering code from the first list of triggering codes triggering transmission of the first sounding reference signal resource set and indicating the first available slot offset.

In some examples, the available slot identifier 1335 may be configured as or otherwise support a means for receiving, in the downlink control information, a first bit field indicating the first available slot offset and a second bit field indicating the second available slot offset. In some examples, the available slot identifier 1335 may be configured as or otherwise support a means for determining that the first bit field indicates the first available slot offset and the second bit field indicates the second available slot offset based on an order of the first bit field and the second bit field in the downlink control information.

In some examples, the available slot identifier 1335 may be configured as or otherwise support a means for identifying the first available slot for the first sounding reference signal resource set before the second available slot for the second sounding reference signal resource set. In some examples, the available slot identifier 1335 may be configured as or otherwise support a means for identifying the second available slot for the second sounding reference signal resource set based on the first available slot being unavailable for the second sounding reference signal resource set.

In some examples, to support identifying the first available slot before the second available slot, the available slot identifier 1335 may be configured as or otherwise support a means for identifying the first available slot before the second available slot based on the first available slot offset being greater than the second available slot offset. In some examples, to support identifying the first available slot before the second available slot, the available slot identifier 1335 may be configured as or otherwise support a means for identifying the first available slot before the second available slot based on the first available slot offset being less than the second available slot offset.

In some examples, to support identifying the first available slot before the second available slot, the available slot identifier 1335 may be configured as or otherwise support a means for identifying the first available slot before the second available slot based on a first index of the first sounding reference signal resource set and a second index of the second sounding reference signal resource set. In some examples, to support identifying the first available slot before the second available slot, the available slot identifier 1335 may be configured as or otherwise support a means for identifying the first available slot before the second available slot based on a first usage of the first sounding reference signal resource set and a second usage of the second sounding reference signal resource set. In some examples, to support identifying the first available slot before the second available slot, the available slot identifier 1335 may be configured as or otherwise support a means for identifying the first available slot before the second available slot based on the first sounding reference signal resource set being scheduled for transmission on partial frequency resources.

In some examples, to support identifying the first available slot before the second available slot, the available slot identifier 1335 may be configured as or otherwise support a means for identifying the first available slot before the second available slot based on a first configuration of the first sounding reference signal resource set and a second configuration of the second sounding reference signal resource set, where the first configuration and the second configuration each include a number of sounding reference signal resources, a transmit power, a frequency hopping configuration, a number of repetitions, or any combination thereof. In some examples, the first available slot indicated for the first sounding reference signal resource set and the second available slot indicated for the second sounding reference signal resource set are a same slot.

In some examples, to support transmitting the first sounding reference signal resource set, the second sounding reference signal resource set, or both, the SRS manager 1340 may be configured as or otherwise support a means for transmitting the first sounding reference signal resource set on a first subset of symbols in the same slot. In some examples, to support transmitting the first sounding reference signal resource set, the second sounding reference signal resource set, or both, the SRS manager 1340 may be configured as or otherwise support a means for transmitting the second sounding reference signal resource set on a second subset of symbols in the same slot.

In some examples, to support transmitting the first sounding reference signal resource set, the second sounding reference signal resource set, or both, the SRS manager 1340 may be configured as or otherwise support a means for transmitting either the first sounding reference signal resource set or the second sounding reference signal resource set. In some examples, the conflict resolution manager 1355 may be configured as or otherwise support a means for determining whether to transmit the first sounding reference signal resource set or the second sounding reference signal resource set based on a first usage, index, or configuration of the first sounding reference signal resource set and a second usage, index, or configuration of the second sounding reference signal resource set.

Figure 14:
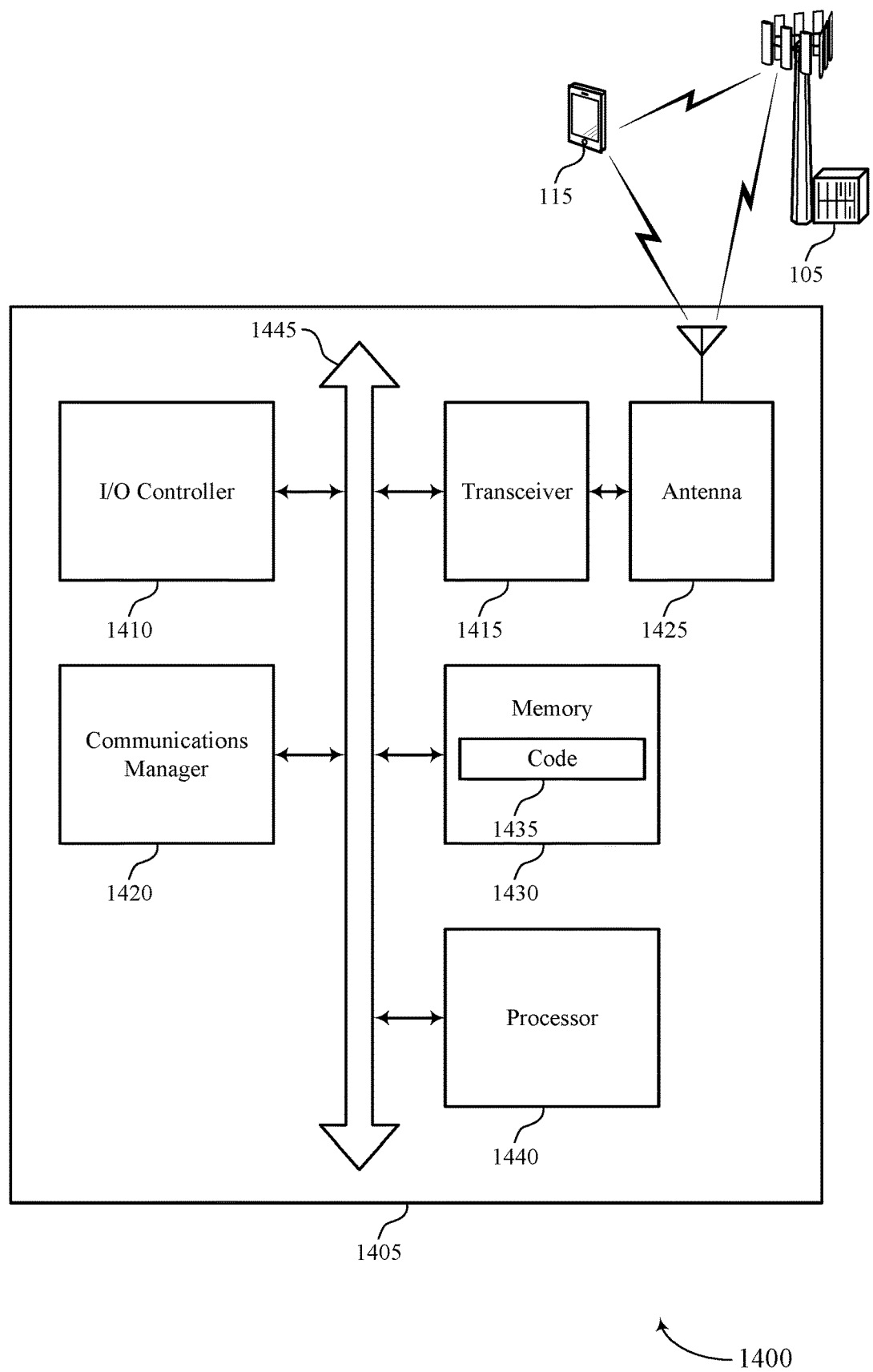
FIG. 14 shows a diagram of a system including a device that supports multiple SRS transmissions triggered by DCI in accordance with aspects of the present disclosure.

FIG. 14 shows a diagram of a system 1400 including a device 1405 that supports multiple sounding reference signal transmissions triggered by downlink control information in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting multiple sounding reference signal transmissions triggered by downlink control information). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a UE in accordance with examples as disclosed herein. For example, the communications manager 1420 may be configured as or otherwise support a means for receiving (e.g., at a first time) first downlink control information from a first transmission and reception point, the first downlink control information triggering transmission of a first sounding reference signal resource set. The communications manager 1420 may be configured as or otherwise support a means for receiving (e.g., at a second time different than the first time) second downlink control information from a second transmission and reception point, the second downlink control information triggering transmission of a second sounding reference signal resource set. The communications manager 1420 may be configured as or otherwise support a means for identifying a reference slot for the first sounding reference signal resource set and the second sounding reference signal resource set. The communications manager 1420 may be configured as or otherwise support a means for identifying a first available slot for the first sounding reference signal resource set and a second available slot for the second sounding reference signal resource set, where the first available slot is offset from the reference slot by a first available slot offset indicated in the first downlink control information and the second available slot is offset from the reference slot by a second available slot offset indicated in the second downlink control information. The communications manager 1420 may be configured as or otherwise support a means for transmitting the first sounding reference signal resource set in the first available slot and the second sounding reference signal resource set in the second available slot.

Additionally, or alternatively, the communications manager 1420 may support wireless communication at a UE in accordance with examples as disclosed herein. For example, the communications manager 1420 may be configured as or otherwise support a means for receiving a configuration message indicating a first list of offsets for a first sounding reference signal resource set and a second list of offsets for a second sounding reference signal resource set. The communications manager 1420 may be configured as or otherwise support a means for receiving downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set. The communications manager 1420 may be configured as or otherwise support a means for transmitting the first sounding reference signal resource set in the first available slot, the second sounding reference signal resource set in the second available slot, or both.

By including or configuring the communications manager 1420 in accordance with examples as described herein, the device 1405 may support techniques for more efficient utilization of communication resources. In particular, a UE may be able to efficiently identify resources on which to transmit SRSs to a base station, and the base station may use the SRSs to efficiently schedule communications with the UE. Such efficient scheduling may result in improved communication reliability, reduced latency, reduced power consumption, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of multiple sounding reference signal transmissions triggered by downlink control information as described herein, or the processor 1440 and the memory 1430 may be otherwise configured to perform or support such operations.

Figure 15:
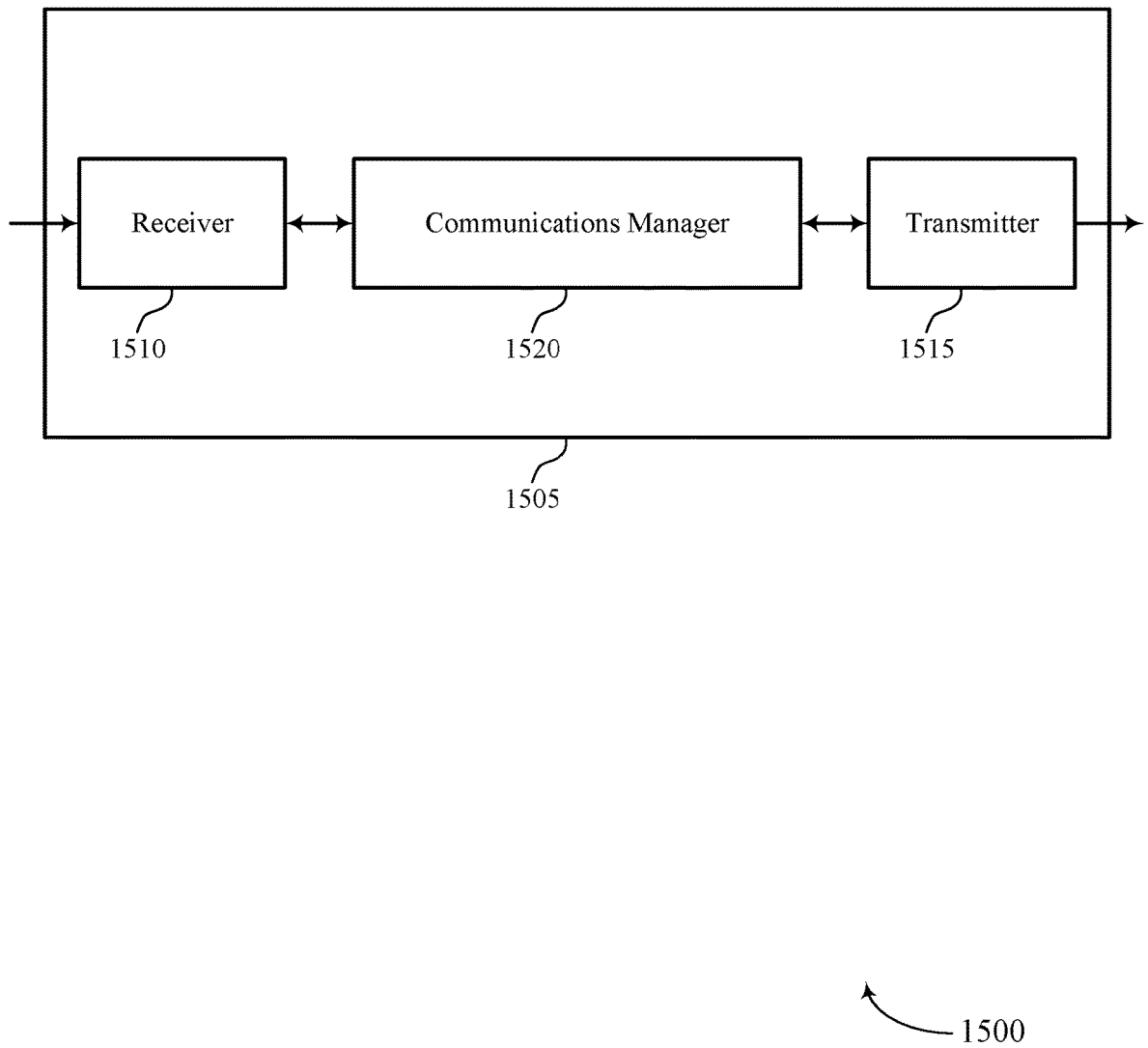
FIGS. 15 and 16 show block diagrams of devices that support multiple SRS transmissions triggered by DCI in accordance with aspects of the present disclosure.

FIG. 15 shows a block diagram 1500 of a device 1505 that supports multiple sounding reference signal transmissions triggered by downlink control information in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to multiple sounding reference signal transmissions triggered by downlink control information). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to multiple sounding reference signal transmissions triggered by downlink control information). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of multiple sounding reference signal transmissions triggered by downlink control information as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. For example, the communications manager 1520 may be configured as or otherwise support a means for transmitting a configuration message indicating a first list of offsets for a first sounding reference signal resource set and a second list of offsets for a second sounding reference signal resource set. The communications manager 1520 may be configured as or otherwise support a means for transmitting downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set. The communications manager 1520 may be configured as or otherwise support a means for receiving the first sounding reference signal resource set in the first available slot, the second sounding reference signal resource set in the second available slot, or both.

By including or configuring the communications manager 1520 in accordance with examples as described herein, the device 1505 (e.g., a processor controlling or otherwise coupled to the receiver 1510, the transmitter 1515, the communications manager 1520, or any combination thereof) may support techniques for more efficient utilization of communication resources. In particular, a UE may be able to efficiently identify resources on which to transmit SRSs to a base station, and the base station may use the SRSs to efficiently schedule communications with the UE. Such efficient scheduling may result in improved communication reliability, reduced latency, reduced power consumption, and improved utilization of processing capability.

Figure 16:
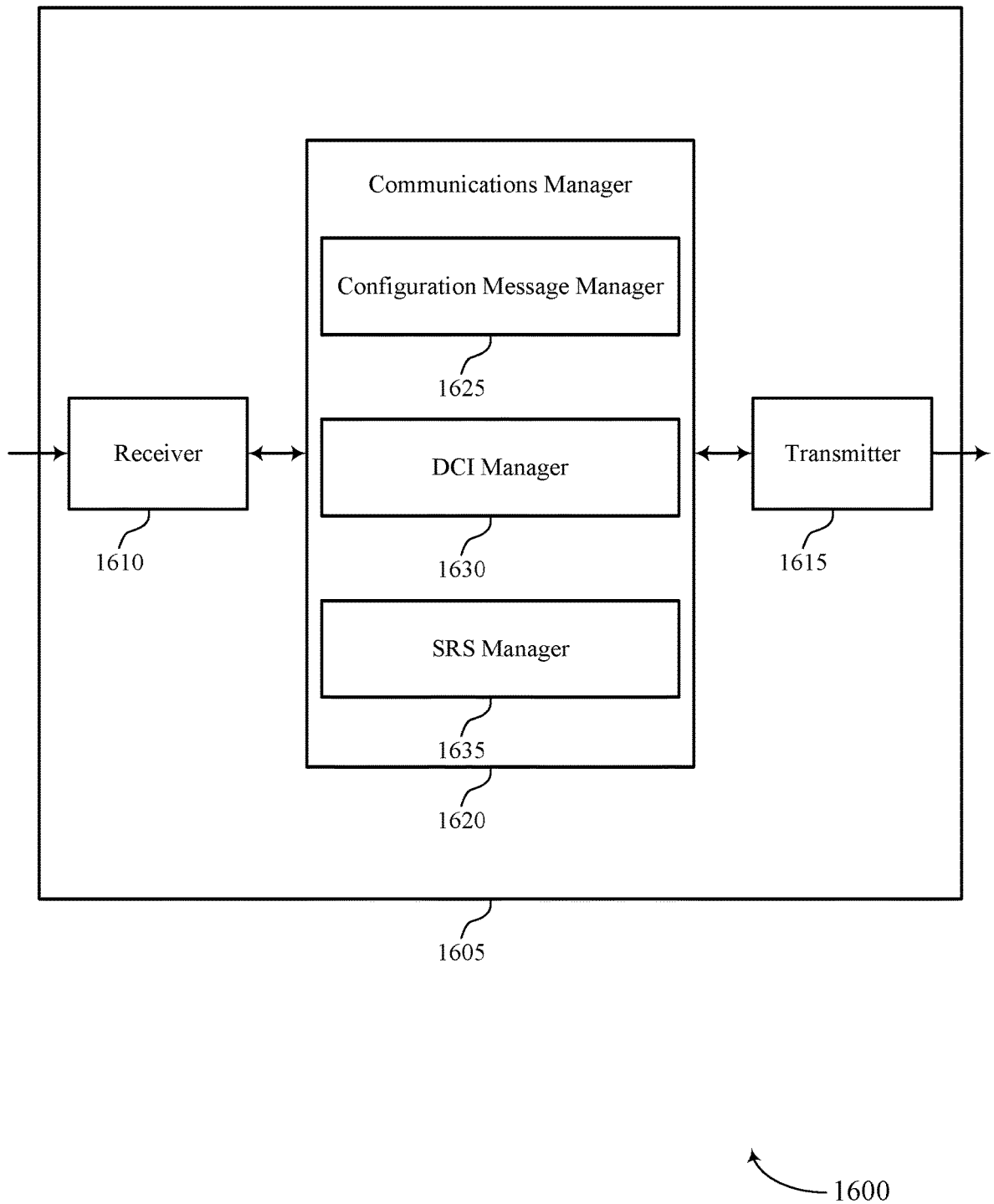

FIG. 16 shows a block diagram 1600 of a device 1605 that supports multiple sounding reference signal transmissions triggered by downlink control information in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to multiple sounding reference signal transmissions triggered by downlink control information). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to multiple sounding reference signal transmissions triggered by downlink control information). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of multiple sounding reference signal transmissions triggered by downlink control information as described herein. For example, the communications manager 1620 may include a configuration message manager 1625, a DCI manager 1630, an SRS manager 1635, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at a base station in accordance with examples as disclosed herein. The configuration message manager 1625 may be configured as or otherwise support a means for transmitting a configuration message indicating a first list of offsets for a first sounding reference signal resource set and a second list of offsets for a second sounding reference signal resource set. The DCI manager 1630 may be configured as or otherwise support a means for transmitting downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set. The SRS manager 1635 may be configured as or otherwise support a means for receiving the first sounding reference signal resource set in the first available slot, the second sounding reference signal resource set in the second available slot, or both.

Figure 17:
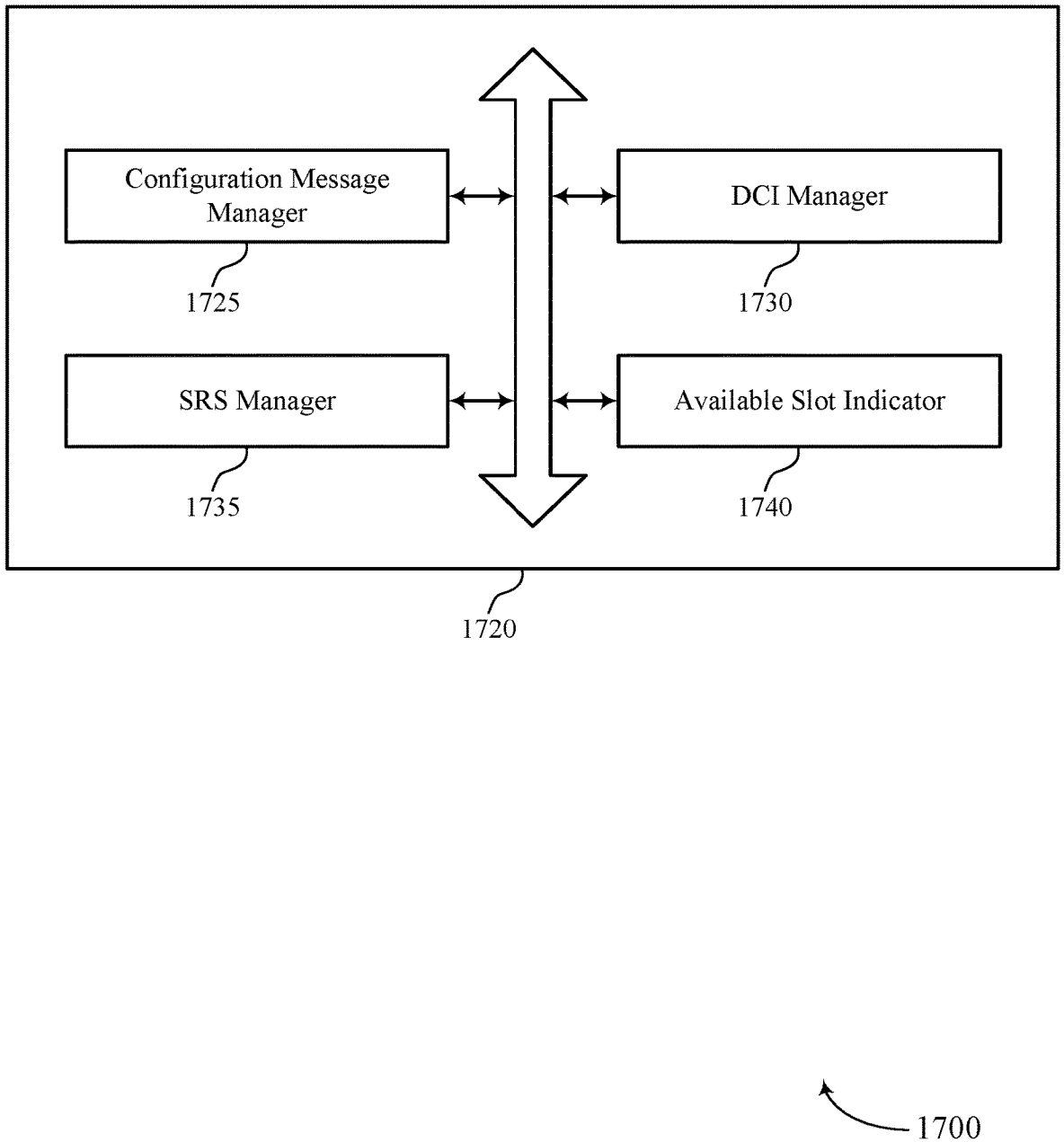
FIG. 17 shows a block diagram of a communications manager that supports multiple SRS transmissions triggered by DCI in accordance with aspects of the present disclosure.

FIG. 17 shows a block diagram 1700 of a communications manager 1720 that supports multiple sounding reference signal transmissions triggered by downlink control information in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of multiple sounding reference signal transmissions triggered by downlink control information as described herein. For example, the communications manager 1720 may include a configuration message manager 1725, a DCI manager 1730, an SRS manager 1735, an available slot indicator 1740, or any combination thereof. Each of these components may communicate, directly or indirectly, with one another (e.g., via one or more buses).

The communications manager 1720 may support wireless communication at a base station in accordance with examples as disclosed herein. The configuration message manager 1725 may be configured as or otherwise support a means for transmitting a configuration message indicating a first list of offsets for a first sounding reference signal resource set and a second list of offsets for a second sounding reference signal resource set. The DCI manager 1730 may be configured as or otherwise support a means for transmitting downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set. The SRS manager 1735 may be configured as or otherwise support a means for receiving the first sounding reference signal resource set in the first available slot, the second sounding reference signal resource set in the second available slot, or both.

In some examples, the available slot indicator 1740 may be configured as or otherwise support a means for transmitting, in the downlink control information, a bit field indicating the first available slot offset and the second available slot offset. In some examples, the configuration message manager 1725 may be configured as or otherwise support a means for transmitting, in the configuration message, a first list of triggering codes for triggering transmission of the first sounding reference signal resource set, where each triggering code in the first list corresponds to an offset for the first sounding reference signal resource set. In some examples, the available slot indicator 1740 may be configured as or otherwise support a means for transmitting, in the downlink control information, a triggering code from the first list of triggering codes triggering transmission of the first sounding reference signal resource set and indicating the first available slot offset.

In some examples, the available slot indicator 1740 may be configured as or otherwise support a means for transmitting, in the downlink control information, a first bit field indicating the first available slot offset and a second bit field indicating the second available slot offset. In some examples, to support transmitting the first bit field indicating the first available slot offset and the second bit field indicating the second available slot offset, the available slot indicator 1740 may be configured as or otherwise support a means for transmitting the first bit field and the second bit field in an order such that the first bit field corresponds to the first sounding reference signal resource set and the second bit field corresponds to the second sounding reference signal resource set.

In some examples, the first available slot indicated for the first sounding reference signal resource set and the second available slot indicated for the second sounding reference signal resource set are a same slot. In some examples, to support receiving the first sounding reference signal resource set, the second sounding reference signal resource set, or both, the SRS manager 1735 may be configured as or otherwise support a means for receiving the first sounding reference signal resource set on a first subset of symbols in the same slot. In some examples, to support receiving the first sounding reference signal resource set, the second sounding reference signal resource set, or both, the SRS manager 1735 may be configured as or otherwise support a means for receiving the second sounding reference signal resource set on a second subset of symbols in the same slot. In some examples, to support receiving the first sounding reference signal resource set, the second sounding reference signal resource set, or both, the SRS manager 1735 may be configured as or otherwise support a means for receiving either the first sounding reference signal resource set or the second sounding reference signal resource set.

Figure 18:
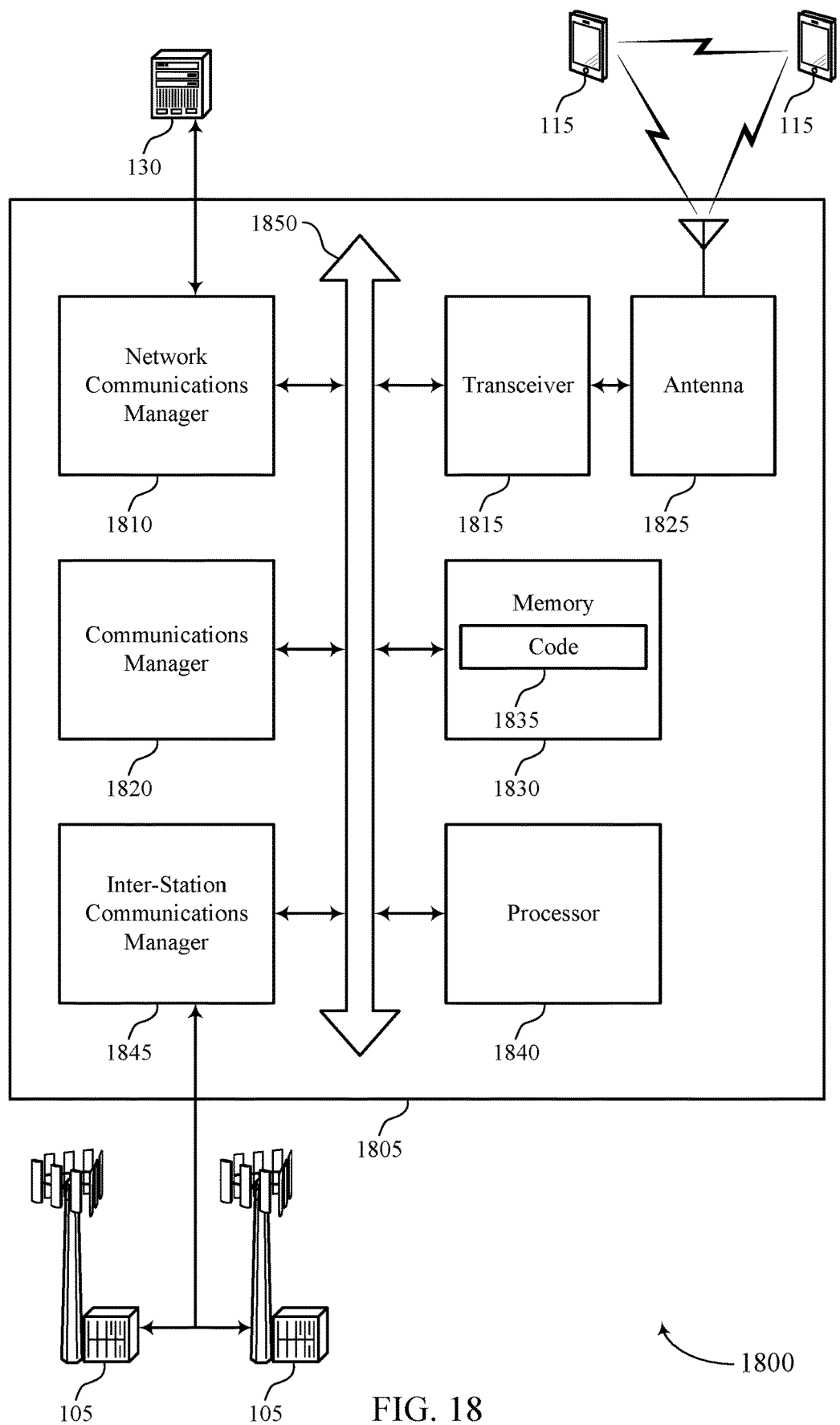
FIG. 18 shows a diagram of a system including a device that supports multiple SRS transmissions triggered by DCI in accordance with aspects of the present disclosure.

FIG. 18 shows a diagram of a system 1800 including a device 1805 that supports multiple sounding reference signal transmissions triggered by downlink control information in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting multiple sounding reference signal transmissions triggered by downlink control information). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communication at a base station in accordance with examples as disclosed herein. For example, the communications manager 1820 may be configured as or otherwise support a means for transmitting a configuration message indicating a first list of offsets for a first sounding reference signal resource set and a second list of offsets for a second sounding reference signal resource set. The communications manager 1820 may be configured as or otherwise support a means for transmitting downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set. The communications manager 1820 may be configured as or otherwise support a means for receiving the first sounding reference signal resource set in the first available slot, the second sounding reference signal resource set in the second available slot, or both.

By including or configuring the communications manager 1820 in accordance with examples as described herein, the device 1805 may support techniques for more efficient utilization of communication resources. In particular, a UE may be able to efficiently identify resources on which to transmit SRSs to a base station, and the base station may use the SRSs to efficiently schedule communications with the UE. Such efficient scheduling may result in improved communication reliability, reduced latency, reduced power consumption, and improved utilization of processing capability.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of multiple sounding reference signal transmissions triggered by downlink control information as described herein, or the processor 1840 and the memory 1830 may be otherwise configured to perform or support such operations.

Figure 19:
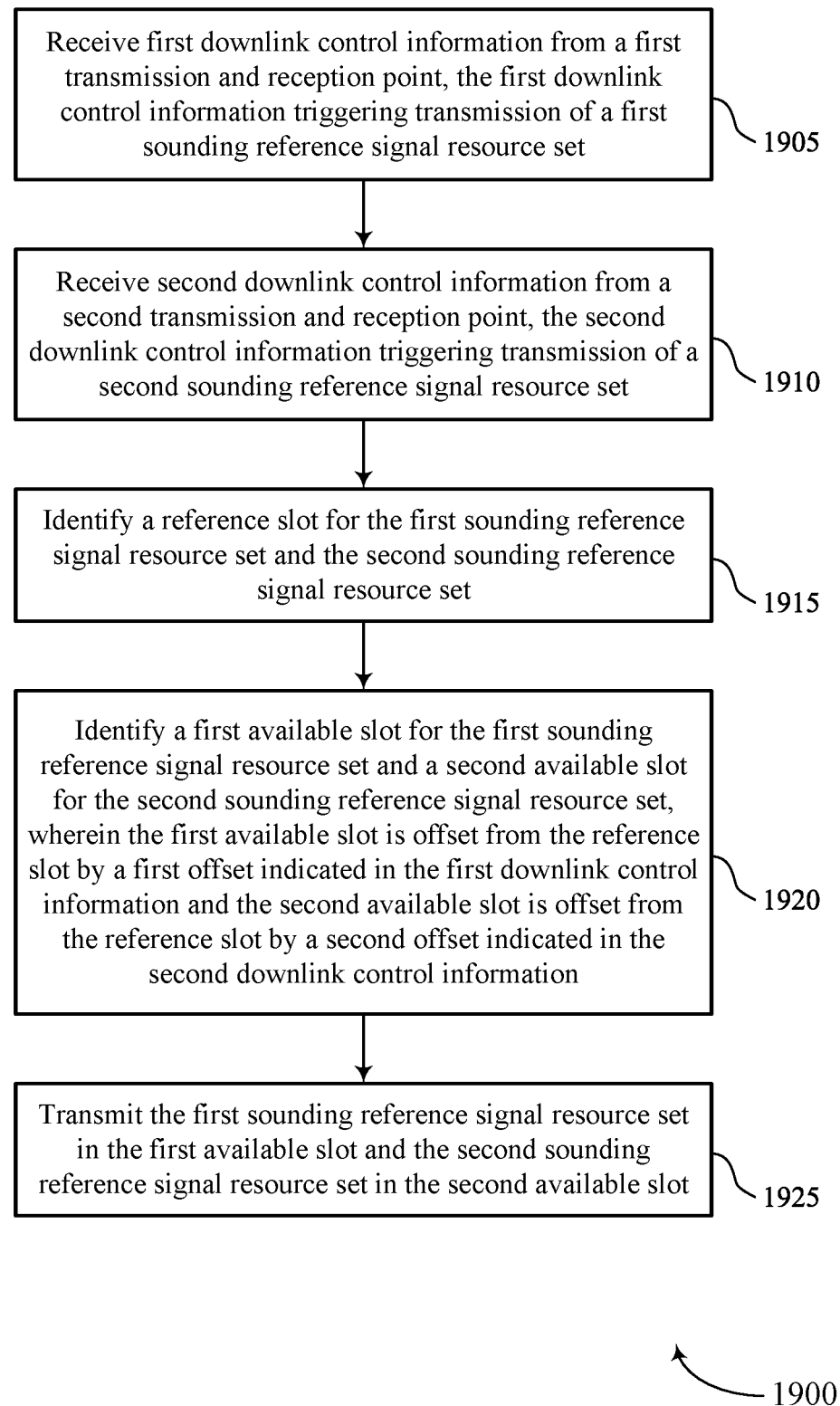
FIGS. 19 through 21 show flowcharts illustrating methods that support multiple SRS transmissions triggered by DCI in accordance with aspects of the present disclosure.

FIG. 19 shows a flowchart illustrating a method 1900 that supports multiple sounding reference signal transmissions triggered by downlink control information in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1905, the method may include receiving (e.g., at a first time) first downlink control information from a first transmission and reception point, the first downlink control information triggering transmission of a first sounding reference signal resource set. The operations of 1905 may be performed in accordance with examples as disclosed herein. In some examples, aspects of the operations of 1905 may be performed by a DCI manager 1325 as described with reference to FIG. 13.

At 1910, the method may include receiving (e.g., at a second time different than the first time) second downlink control information from a second transmission and reception point, the second downlink control information triggering transmission of a second sounding reference signal resource set. The operations of 1910 may be performed in accordance with examples as disclosed herein. In some examples, aspects of the operations of 1910 may be performed by a DCI manager 1325 as described with reference to FIG. 13.

At 1915, the method may include identifying a reference slot for the first sounding reference signal resource set and the second sounding reference signal resource set. The operations of 1915 may be performed in accordance with examples as disclosed herein. In some examples, aspects of the operations of 1915 may be performed by a reference slot manager 1330 as described with reference to FIG. 13.

At 1920, the method may include identifying a first available slot for the first sounding reference signal resource set and a second available slot for the second sounding reference signal resource set, where the first available slot is offset from the reference slot by a first offset (e.g., a first available slot offset) indicated in the first downlink control information and the second available slot is offset from the reference slot by a second offset (e.g., a second available slot offset) indicated in the second downlink control information. The operations of 1920 may be performed in accordance with examples as disclosed herein. In some examples, aspects of the operations of 1920 may be performed by an available slot identifier 1335 as described with reference to FIG. 13.

At 1925, the method may include transmitting the first sounding reference signal resource set in the first available slot and the second sounding reference signal resource set in the second available slot. The operations of 1925 may be performed in accordance with examples as disclosed herein. In some examples, aspects of the operations of 1925 may be performed by an SRS manager 1340 as described with reference to FIG. 13.

Figure 20:
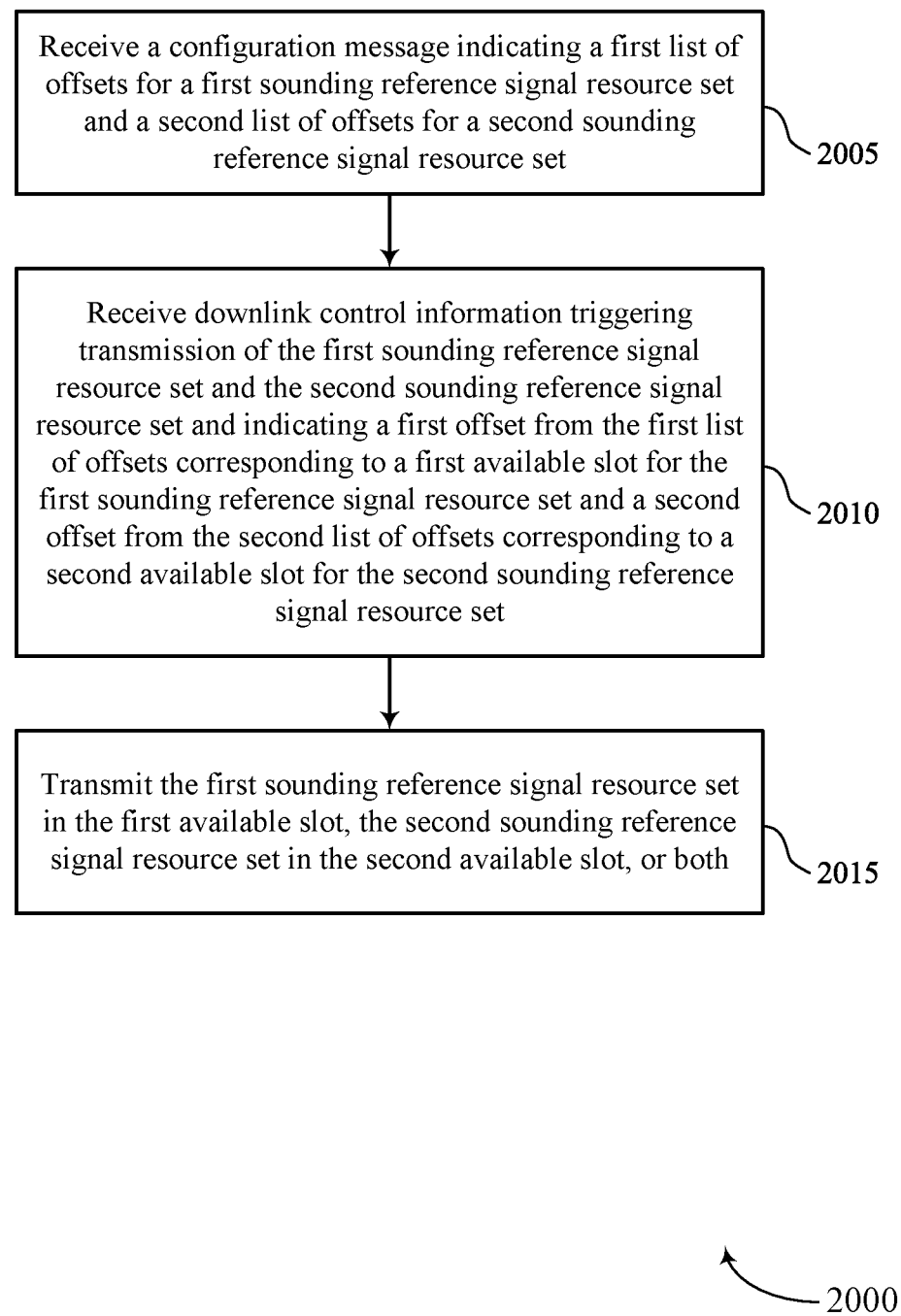

FIG. 20 shows a flowchart illustrating a method 2000 that supports multiple sounding reference signal transmissions triggered by downlink control information in accordance with aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2005, the method may include receiving a configuration message indicating a first list of offsets for a first sounding reference signal resource set and a second list of offsets for a second sounding reference signal resource set. The operations of 2005 may be performed in accordance with examples as disclosed herein. In some examples, aspects of the operations of 2005 may be performed by a configuration message manager 1345 as described with reference to FIG. 13.

At 2010, the method may include receiving downlink control information triggering transmission of the first sounding reference signal resource set and the second sounding reference signal resource set and indicating a first slot offset (e.g., a first available slot offset) from the first list of offsets corresponding to a first available slot for the first sounding reference signal resource set and a second slot offset (e.g., a second available slot offset) from the second list of offsets corresponding to a second available slot for the second sounding reference signal resource set. The operations of 2010 may be performed in accordance with examples as disclosed herein. In some examples, aspects of the operations of 2010 may be performed by a DCI manager 1325 as described with reference to FIG. 13.

At 2015, the method may include transmitting the first sounding reference signal resource set in the first available slot, the second sounding reference signal resource set in the second available slot, or both. The operations of 2015 may be performed in accordance with examples as disclosed herein. In some examples, aspects of the operations of 2015 may be performed by an SRS manager 1340 as described with reference to FIG. 13.

Figure 21:
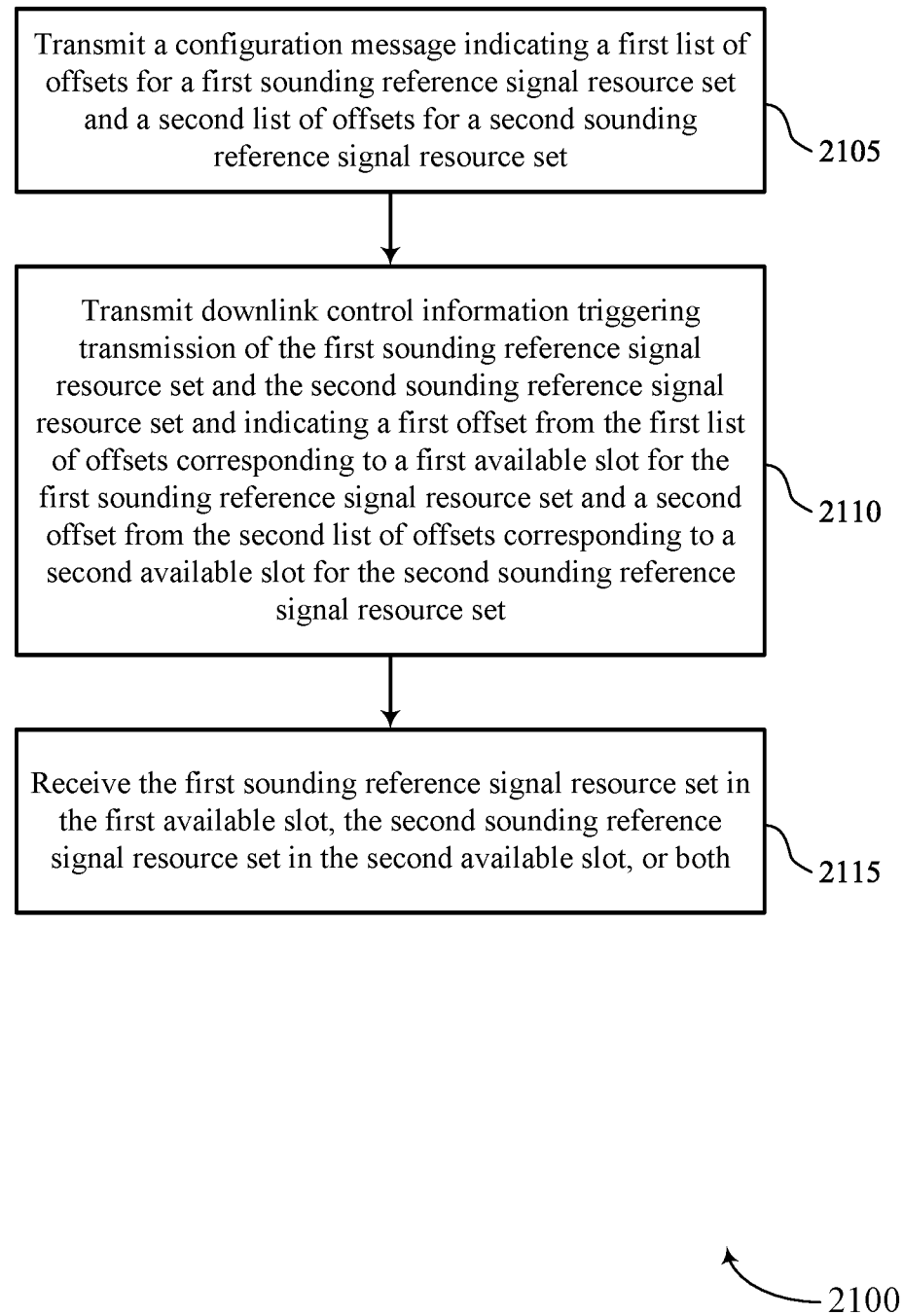

FIG. 21 shows a flowchart illustrating a method 2100 that supports multiple sounding reference signal transmissions triggered by downlink control information in accordance with aspects of the present disclosure. The operations of the method 2100 may be implemented by a base station or its components as described herein. For example, the operations of the method 2100 may be performed by a base station 105 as described with reference to FIGS. 1 through 10 and 15 through 18. In some examples, a base station may execute a set of instructions to control the functional elements of the base station to perform the described functions. Additionally, or alternatively, the base station may perform aspects of the described functions using special-purpose hardware.

At 2105, the method may include transmitting a configuration message indicating a first list of offsets for a first sounding reference signal resource set and a second list of offsets for a second sounding reference signal resource set. The operations of 2105 may be performed in accordance with examples as disclosed herein. In some examples, aspects of the operations of 2105 may be performed by a configuration message manager 1725 as described with reference to FIG. 17.

At 2110, the method may include transmitting downlink control information triggering transmission of the first sounding reference signal resource set and the second sounding reference signal resource set and indicating a first slot offset (e.g., a first available slot offset) from the first list of offsets corresponding to a first available slot for the first sounding reference signal resource set and a second slot offset (e.g., a second available slot offset) from the second list of offsets corresponding to a second available slot for the second sounding reference signal resource set. The operations of 2110 may be performed in accordance with examples as disclosed herein. In some examples, aspects of the operations of 2110 may be performed by a DCI manager 1730 as described with reference to FIG. 17.

At 2115, the method may include receiving the first sounding reference signal resource set in the first available slot, the second sounding reference signal resource set in the second available slot, or both. The operations of 2115 may be performed in accordance with examples as disclosed herein. In some examples, aspects of the operations of 2115 may be performed by an SRS manager 1735 as described with reference to FIG. 17.

The following provides an overview of aspects of the present disclosure:

Aspect 1: A method for wireless communication at a UE, comprising: receiving first downlink control information from a first transmission and reception point, the first downlink control information triggering transmission of a first sounding reference signal resource set; receiving second downlink control information from a second transmission and reception point, the second downlink control information triggering transmission of a second sounding reference signal resource set; identifying a reference slot for the first sounding reference signal resource set and the second sounding reference signal resource set; identifying a first available slot for the first sounding reference signal resource set and a second available slot for the second sounding reference signal resource set, wherein the first available slot is offset from the reference slot by a first available slot offset indicated in the first downlink control information and the second available slot is offset from the reference slot by a second available slot offset indicated in the second downlink control information; and transmitting the first sounding reference signal resource set in the first available slot and the second sounding reference signal resource set in the second available slot.

Aspect 2: The method of aspect 1, wherein identifying the first available slot for the first sounding reference signal resource set comprises: identifying the first available slot for the first sounding reference signal resource set from one or more candidate slots following a processing time after a timestamp determined based at least in part on receiving the first downlink control information and the second downlink control information.

Aspect 3: The method of aspect 2, further comprising: identifying the timestamp as a last symbol of a control channel that includes the second downlink control information or a last symbol of a search space associated with the control channel that includes the second downlink control information.

Aspect 4: The method of any of aspects 1 through 3, wherein identifying the first available slot for the first sounding reference signal resource set comprises: identifying the first available slot for the first sounding reference signal resource set from one or more candidate slots following a timestamp determined based at least in part on receiving the first downlink control information and the second downlink control information.

Aspect 5: The method of aspect 4, further comprising: identifying the timestamp as a symbol preceding one or more symbols in a candidate slot available for the first sounding reference signal resource set by a processing time.

Aspect 6: The method of aspect 5, wherein the second downlink control information is received and correctly decoded by the timestamp.

Aspect 7: The method of any of aspects 5 through 6, wherein at least one of the first downlink control information or the second downlink control information is received and correctly decoded by the timestamp.

Aspect 8: The method of any of aspects 1 through 7, further comprising: determining the reference slot to be a slot in which the second downlink control information is received.

Aspect 9: The method of any of aspects 1 through 8, further comprising: receiving an indication of an offset in the second downlink control information; and determining the reference slot based at least in part on the offset and a slot in which the second downlink control information is received.

Aspect 10: A method for wireless communication at a UE, comprising: receiving a configuration message indicating a first list of offsets for a first sounding reference signal resource set and a second list of offsets for a second sounding reference signal resource set; receiving downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set; and transmitting the first sounding reference signal resource set in the first available slot, the second sounding reference signal resource set in the second available slot, or both.

Aspect 11: The method of aspect 10, further comprising: receiving, in the downlink control information, a bit field indicating the first available slot offset and the second available slot offset.

Aspect 12: The method of any of aspects 10 through 11, further comprising: receiving, in the configuration message, a first list of triggering codes for triggering transmission of the first sounding reference signal resource set, wherein each triggering code in the first list corresponds to an offset for the first sounding reference signal resource set; and receiving, in the downlink control information, a triggering code from the first list of triggering codes triggering transmission of the first sounding reference signal resource set and indicating the first available slot offset.

Aspect 13: The method of any of aspects 10 through 12, further comprising: receiving, in the downlink control information, a first bit field indicating the first available slot offset and a second bit field indicating the second available slot offset.

Aspect 14: The method of aspect 13, further comprising: determining that the first bit field indicates the first available slot offset and the second bit field indicates the second available slot offset based at least in part on an order of the first bit field and the second bit field in the downlink control information.

Aspect 15: The method of any of aspects 10 through 14, further comprising: identifying the first available slot for the first sounding reference signal resource set before the second available slot for the second sounding reference signal resource set; and identifying the second available slot for the second sounding reference signal resource set based at least in part on the first available slot being unavailable for the second sounding reference signal resource set.

Aspect 16: The method of aspect 15, wherein identifying the first available slot before the second available slot comprises: identifying the first available slot before the second available slot based at least in part on the first available slot offset being greater than the second available slot offset.

Aspect 17: The method of any of aspects 15 through 16, wherein identifying the first available slot before the second available slot comprises: identifying the first available slot before the second available slot based at least in part on the first available slot offset being less than the second available slot offset.

Aspect 18: The method of any of aspects 15 through 17, wherein identifying the first available slot before the second available slot comprises: identifying the first available slot before the second available slot based at least in part on a first index of the first sounding reference signal resource set and a second index of the second sounding reference signal resource set.

Aspect 19: The method of any of aspects 15 through 18, wherein identifying the first available slot before the second available slot comprises: identifying the first available slot before the second available slot based at least in part on a first usage of the first sounding reference signal resource set and a second usage of the second sounding reference signal resource set.

Aspect 20: The method of any of aspects 15 through 19, wherein identifying the first available slot before the second available slot comprises: identifying the first available slot before the second available slot based at least in part on the first sounding reference signal resource set being scheduled for transmission on partial frequency resources.

Aspect 21: The method of any of aspects 15 through 20, wherein identifying the first available slot before the second available slot comprises: identifying the first available slot before the second available slot based at least in part on a first configuration of the first sounding reference signal resource set and a second configuration of the second sounding reference signal resource set, wherein the first configuration and the second configuration each comprise a number of sounding reference signal resources, a transmit power, a frequency hopping configuration, a number of repetitions, or any combination thereof.

Aspect 22: The method of any of aspects 15 through 21, wherein identifying the first available slot before the second available slot comprises: identifying the first available slot before the second available slot based at least in part on the first available slot offset being different than the second available slot offset, a first index of the first sounding reference signal resource set, a second index of the second sounding reference signal resource set, the first sounding reference signal resource set being scheduled for transmission on partial frequency resources, a first configuration of the first sounding reference signal resource set, a second configuration of the second sounding reference signal resource set, or any combination thereof, wherein the first configuration and the second configuration each comprise a number of sounding reference signal resources, a transmit power, a frequency hopping configuration, a number of repetitions, or any combination thereof.

Aspect 23: The method of any of aspects 10 through 22, wherein the first available slot indicated for the first sounding reference signal resource set and the second available slot indicated for the second sounding reference signal resource set are a same slot.

Aspect 24: The method of aspect 23, wherein transmitting the first sounding reference signal resource set, the second sounding reference signal resource set, or both comprises: transmitting the first sounding reference signal resource set on a first subset of symbols in the same slot; and transmitting the second sounding reference signal resource set on a second subset of symbols in the same slot.

Aspect 25: The method of any of aspects 23 through 24, wherein transmitting the first sounding reference signal resource set, the second sounding reference signal resource set, or both comprises: transmitting either the first sounding reference signal resource set or the second sounding reference signal resource set.

Aspect 26: The method of aspect 25, further comprising: determining whether to transmit the first sounding reference signal resource set or the second sounding reference signal resource set based at least in part on a first usage, index, or configuration of the first sounding reference signal resource set and a second usage, index, or configuration of the second sounding reference signal resource set.

Aspect 27: A method for wireless communication at a base station, comprising: transmitting a configuration message indicating a first list of offsets for a first sounding reference signal resource set and a second list of offsets for a second sounding reference signal resource set; transmitting downlink control information triggering transmission of the first sounding reference signal resource set and the second sounding reference signal resource set and indicating a first available slot offset from the first list of offsets corresponding to a first available slot for the first sounding reference signal resource set and a second available slot offset from the second list of offsets corresponding to a second available slot for the second sounding reference signal resource set; and receiving the first sounding reference signal resource set in the first available slot, the second sounding reference signal resource set in the second available slot, or both.

Aspect 28: The method of aspect 27, further comprising: transmitting, in the downlink control information, a bit field indicating the first available slot offset and the second available slot offset.

Aspect 29: The method of any of aspects 27 through 28, further comprising: transmitting, in the configuration message, a first list of triggering codes for triggering transmission of the first sounding reference signal resource set, wherein each triggering code in the first list corresponds to an offset for the first sounding reference signal resource set; and transmitting, in the downlink control information, a triggering code from the first list of triggering codes triggering transmission of the first sounding reference signal resource set and indicating the first available slot offset.

Aspect 30: The method of any of aspects 27 through 29, further comprising: transmitting, in the downlink control information, a first bit field indicating the first available slot offset and a second bit field indicating the second available slot offset.

Aspect 31: The method of aspect 30, wherein transmitting the first bit field indicating the first available slot offset and the second bit field indicating the second available slot offset comprises: transmitting the first bit field and the second bit field in an order such that the first bit field corresponds to the first sounding reference signal resource set and the second bit field corresponds to the second sounding reference signal resource set.

Aspect 32: The method of any of aspects 27 through 31, wherein the first available slot indicated for the first sounding reference signal resource set and the second available slot indicated for the second sounding reference signal resource set are a same slot.

Aspect 33: The method of aspect 32, wherein receiving the first sounding reference signal resource set, the second sounding reference signal resource set, or both comprises: receiving the first sounding reference signal resource set on a first subset of symbols in the same slot; and receiving the second sounding reference signal resource set on a second subset of symbols in the same slot.

Aspect 34: The method of any of aspects 32 through 33, wherein receiving the first sounding reference signal resource set, the second sounding reference signal resource set, or both comprises: receiving either the first sounding reference signal resource set or the second sounding reference signal resource set.

Aspect 35: A method for wireless communication at a UE, comprising: receiving, at a first time, first downlink control information from a first transmission and reception point, the first downlink control information triggering transmission of a first sounding reference signal resource set; receiving, at a second time, second downlink control information from a second transmission and reception point, the second downlink control information triggering transmission of a second sounding reference signal resource set, where the first time occurs before the second time; identifying a reference slot for the first sounding reference signal resource set and the second sounding reference signal resource set; identifying a timestamp as a last symbol of a control channel that includes the second downlink control information or a last symbol of a search space associated with the control channel that includes the second downlink control information; identifying each of a first available slot for the first sounding reference signal resource set and a second available slot for the second sounding reference signal resource set based at least in part on a processing time after the timestamp, wherein the first available slot is offset from the reference slot by a first available slot offset and the second reference slot is offset from the available slot by a second available slot offset; and transmitting the first sounding reference signal resource set in the first available slot and the second sounding reference signal resource set in the second available slot.

Aspect 36: The method of aspect 35, wherein identifying the first available slot for the first sounding reference signal resource set comprises: identifying the first available slot for the first sounding reference signal resource set from one or more candidate slots, wherein the timestamp is determined based at least in part on receiving the first downlink control information and the second downlink control information.

Aspect 37: The method of any of aspects 35 through 36 further comprising: determining the reference slot to be a slot in which the second downlink control information is received.

Aspect 38: The method of any of aspects 35 through 37, further comprising: receiving an indication of an offset in the second downlink control information; and determining the reference slot based at least in part on the offset and a slot in which the second downlink control information is received.

Aspect 39: An apparatus for wireless communication at a UE, comprising a processor; memory coupled with the processor; and instructions stored in the memory and executable by the processor to cause the apparatus to perform a method of any of aspects 1 through 9.

Aspect 40: An apparatus for wireless communication at a UE, comprising at least one means for performing a method of any of aspects 1 through 9.

Aspect 41: A non-transitory computer-readable medium storing code for wireless communication at a UE, the code comprising instructions executable by a processor to perform a method of any of aspects 1 through 9.

Aspect 42: An apparatus for wireless communication at a UE, comprising a processor; memory coupled with the processor; and instructions stored in the memory and executable by the processor to cause the apparatus to perform a method of any of aspects 10 through 26.

Aspect 43: An apparatus for wireless communication at a UE, comprising at least one means for performing a method of any of aspects 10 through 26.

Aspect 44: A non-transitory computer-readable medium storing code for wireless communication at a UE, the code comprising instructions executable by a processor to perform a method of any of aspects 10 through 26.

Aspect 45: An apparatus for wireless communication at a base station, comprising a processor; memory coupled with the processor; and instructions stored in the memory and executable by the processor to cause the apparatus to perform a method of any of aspects 27 through 34.

Aspect 46: An apparatus for wireless communication at a base station, comprising at least one means for performing a method of any of aspects 27 through 34.

Aspect 47: A non-transitory computer-readable medium storing code for wireless communication at a base station, the code comprising instructions executable by a processor to perform a method of any of aspects 27 through 34.

Aspect 48: An apparatus for wireless communication at a base station, comprising a processor; memory coupled with the processor; and instructions stored in the memory and executable by the processor to cause the apparatus to perform a method of any of aspects 35 through 38.

Aspect 49: An apparatus for wireless communication at a base station, comprising at least one means for performing a method of any of aspects 35 through 38.

Aspect 50: A non-transitory computer-readable medium storing code for wireless communication at a base station, the code comprising instructions executable by a processor to perform a method of any of aspects 35 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, at a first time, a first downlink control information message from a first transmission and reception point, the first downlink control information message triggering transmission of a first set of sounding reference signals via a first sounding reference signal resource set;
   receiving, at a second time, a second downlink control information message from a second transmission and reception point, the second downlink control information message triggering transmission of a second set of sounding reference signals via a second sounding reference signal resource set, wherein the first time occurs before the second time;
   identifying a same reference slot for the first sounding reference signal resource set and the second sounding reference signal resource set;
   identifying a timestamp as a last symbol of a control channel that includes the second downlink control information message or a last symbol of a search space associated with the control channel that includes the second downlink control information message;
   identifying each of a first available slot for the first sounding reference signal resource set and a second available slot for the second sounding reference signal resource set based at least in part on a processing time after the timestamp, wherein the first available slot is offset from the same reference slot by a first available slot offset and the second available slot is offset from the same reference slot by a second available slot offset; and
   transmitting the first set of sounding reference signals via the first sounding reference signal resource set in the first available slot and the second set of sounding reference signals via the second sounding reference signal resource set in the second available slot.

2. The method of claim 1, further comprising:
   determining the same reference slot to be a slot in which the second downlink control information message is received.

3. The method of claim 1, further comprising:
   receiving an indication of an offset in the second downlink control information message; and
   determining the same reference slot based at least in part on the offset and a slot in which the second downlink control information message is received.

4. A method for wireless communication at a user equipment (UE), comprising:
   receiving a configuration message indicating a first list of multiple offsets for a first sounding reference signal resource set and a second list of multiple offsets for a second sounding reference signal resource set;
   receiving a single downlink control information message triggering transmission of a first set of sounding reference signals via the first sounding reference signal resource set and a second set of sounding reference signals via the second sounding reference signal resource set and indicating a first available slot offset from the first list of multiple offsets corresponding to a first available slot for the first sounding reference signal resource set and a second available slot offset from the second list of multiple offsets corresponding to a second available slot for the second sounding reference signal resource set; and
   transmitting the first set of sounding reference signals via the first sounding reference signal resource set in the first available slot, the second set of sounding reference signals via the second sounding reference signal resource set in the second available slot, or both.

5. The method of claim 4, further comprising:
   receiving, in the single downlink control information message, a bit field indicating the first available slot offset and the second available slot offset.

6. The method of claim 4, further comprising:
   receiving, in the configuration message, a first list of triggering codes for triggering transmission of the first set of sounding reference signals via the first sounding reference signal resource set, wherein each triggering code in the first list of triggering codes corresponds to an offset for the first sounding reference signal resource set; and
   receiving, in the single downlink control information message, a triggering code from the first list of triggering codes triggering transmission of the first set of sounding reference signals via the first sounding reference signal resource set and indicating the first available slot offset.

7. The method of claim 4, further comprising:
   receiving, in the single downlink control information message, a first bit field indicating the first available slot offset and a second bit field indicating the second available slot offset.

8. The method of claim 7, further comprising:
   determining that the first bit field indicates the first available slot offset and the second bit field indicates the second available slot offset based at least in part on an order of the first bit field and the second bit field in the single downlink control information message.

9. The method of claim 4, further comprising:
   identifying the first available slot for the first sounding reference signal resource set before the second available slot for the second sounding reference signal resource set; and
   identifying the second available slot for the second sounding reference signal resource set based at least in part on the first available slot being unavailable for the second sounding reference signal resource set.

10. The method of claim 9, wherein identifying the first available slot before the second available slot comprises:
identifying the first available slot before the second available slot based at least in part on the first available slot offset being different than the second available slot offset, a first index of the first sounding reference signal resource set, a second index of the second sounding reference signal resource set, the first set of sounding reference signals via the first sounding reference signal resource set being scheduled for transmission on partial frequency resources, a first configuration of the first sounding reference signal resource set, a second configuration of the second sounding reference signal resource set, or any combination thereof, wherein the first configuration and the second configuration each comprise a number of sounding reference signal resources, a transmit power, a frequency hopping configuration, a number of repetitions, or any combination thereof.

11. The method of claim 9, wherein identifying the first available slot before the second available slot comprises:
identifying the first available slot before the second available slot based at least in part on a first usage of the first sounding reference signal resource set and a second usage of the second sounding reference signal resource set.

12. The method of claim 4, wherein the first available slot indicated for the first sounding reference signal resource set and the second available slot indicated for the second sounding reference signal resource set are a same slot.

13. The method of claim 12, wherein transmitting the first set of sounding reference signals via the first sounding reference signal resource set, the second set of sounding reference signals via the second sounding reference signal resource set, or both comprises:
transmitting the first set of sounding reference signals via the first sounding reference signal resource set on a first subset of symbols in the same slot; and
transmitting the second set of sounding reference signals via the second sounding reference signal resource set on a second subset of symbols in the same slot.

14. The method of claim 12, wherein transmitting the first sounding reference signal resource set, the second sounding reference signal resource set, or both comprises:
transmitting either the first set of sounding reference signals via the first sounding reference signal resource set or the second set of sounding reference signals via the second sounding reference signal resource set.

15. The method of claim 14, further comprising:
determining whether to transmit the first set of sounding reference signals via the first sounding reference signal resource set or the second set of sounding reference signals via the second sounding reference signal resource set based at least in part on a first usage, index, or configuration of the first sounding reference signal resource set and a second usage, index, or configuration of the second sounding reference signal resource set.

16. An apparatus for wireless communication at a user equipment (UE), comprising:
one or more processors;
memory coupled with the one or more processors; and
instructions stored in the memory and executable by the one or more processors to cause the apparatus to:
receive, at a first time, a first downlink control information message from a first transmission and reception point, the first downlink control information message triggering transmission of a first set of sounding reference signals via a first sounding reference signal resource set;
receive, at a second time, a second downlink control information message from a second transmission and reception point, the second downlink control information message triggering transmission of a second set of sounding reference signals via a second sounding reference signal resource set, wherein the first time occurs before the second time;
identify a same reference slot for the first sounding reference signal resource set and the second sounding reference signal resource set;
identify a timestamp as a last symbol of a control channel that includes the second downlink control information message or a last symbol of a search space associated with the control channel that includes the second downlink control information message;
identify each of a first available slot for the first sounding reference signal resource set and a second available slot for the second sounding reference signal resource set based at least in part on a processing time after the timestamp, wherein the first available slot is offset from the same reference slot by a first available slot offset and the second available slot is offset from the same reference slot by a second available slot offset; and
transmit the first set of sounding reference signals via the first sounding reference signal resource set in the first available slot and the second set of sounding reference signals via the second sounding reference signal resource set in the second available slot.

17. The apparatus of claim 16, wherein the instructions are further executable by the one or more processors to cause the apparatus to:
determine the same reference slot to be a slot in which the second downlink control information message is received.

18. The apparatus of claim 16, wherein the instructions are further executable by the one or more processors to cause the apparatus to:
receive an indication of an offset in the second downlink control information message; and
determine the same reference slot based at least in part on the offset and a slot in which the second downlink control information message is received.

19. An apparatus for wireless communication at a user equipment (UE), comprising:
one or more processors;
memory coupled with the one or more processors; and
instructions stored in the memory and executable by the one or more processors to cause the apparatus to:
receive a configuration message indicating a first list of multiple offsets for a first sounding reference signal resource set and a second list of multiple offsets for a second sounding reference signal resource set;
receive a single downlink control information message triggering transmission of a first set of sounding reference signals via the first sounding reference signal resource set and a second set of sounding reference signals via the second sounding reference signal resource set and indicating a first available slot offset from the first list of multiple offsets corresponding to a first available slot for the first sounding reference signal resource set and a second available slot offset from the second list of multiple offsets corresponding to a second available slot for the second sounding reference signal resource set; and transmit transmitting the first set of sounding reference signals via the first sounding reference signal resource set in the first available slot, the second set of sounding reference signals via the second sounding reference signal resource set in the second available slot, or both.

20. The apparatus of claim 19, wherein the instructions are further executable by the one or more processors to cause the apparatus to:

receive, in the single downlink control information message, a bit field indicating the first available slot offset and the second available slot offset.

21. The apparatus of claim 19, wherein the instructions are further executable by the one or more processors to cause the apparatus to:

receive, in the configuration message, first list of triggering codes for triggering transmission of the first set of sounding reference signals via the first sounding reference signal resource set, wherein each triggering code in the first list of triggering codes corresponds to an offset for the first sounding reference signal resource set; and receive, in the single downlink control information message, a triggering code from the first list of triggering codes triggering transmission of the first set of sounding reference signals via the first sounding reference signal resource set and indicating the first available slot offset.

22. The apparatus of claim 19, wherein the instructions are further executable by the one or more processors to cause the apparatus to:

receive, in the single downlink control information message, a first bit field indicating the first available slot offset and a second bit field indicating the second available slot offset.

23. The apparatus of claim 22, wherein the instructions are further executable by the one or more processors to cause the apparatus to:

determine that the first bit field indicates the first available slot offset and the second bit field indicates the second available slot offset based at least in part on an order of the first bit field and the second bit field in the single downlink control information message.

24. The apparatus of claim 19, wherein the instructions are further executable by the one or more processors to cause the apparatus to:

identify the first available slot for the first sounding reference signal resource set before the second available slot for the second sounding reference signal resource set; and identify the second available slot for the second sounding reference signal resource set based at least in part on the first available slot being unavailable for the second sounding reference signal resource set.

25. The apparatus of claim 24, wherein the instructions to identify the first available slot before the second available slot are executable by the one or more processors to cause the apparatus to:

identify the first available slot before the second available slot based at least in part on the first available slot offset being different than the second available slot offset, a first index of the first sounding reference signal resource set, a second index of the second sounding reference signal resource set, the first set of sounding reference signals via the first sounding reference signal resource set being scheduled for transmission on partial frequency resources, a first configuration of the first sounding reference signal resource set, a second configuration of the second sounding reference signal resource set, or any combination thereof, wherein the first configuration and the second configuration each comprise a number of sounding reference signal resources, a transmit power, a frequency hopping configuration, a number of repetitions, or any combination thereof.

26. The apparatus of claim 24, wherein the instructions to identify the first available slot before the second available slot are executable by the one or more processors to cause the apparatus to:

identify the first available slot before the second available slot based at least in part on a first usage of the first sounding reference signal resource set and a second usage of the second sounding reference signal resource set.

27. The apparatus of claim 19, wherein the first available slot indicated for the first sounding reference signal resource set and the second available slot indicated for the second sounding reference signal resource set are a same slot.

28. The apparatus of claim 27, wherein the instructions to transmit the first set of sounding reference signals via the first sounding reference signal resource set, the second set of sounding reference signals via the second sounding reference signal resource set, or both are executable by the one or more processors to cause the apparatus to:

transmit the first set of sounding reference signals via the first sounding reference signal resource set on a first subset of symbols in the same slot; and transmit the second set of sounding reference signals via the second sounding reference signal resource set on a second subset of symbols in the same slot.

29. The apparatus of claim 19, wherein the instructions to transmit the first sounding reference signal resource set, the second sounding reference signal resource set, or both are executable by the one or more processors to cause the apparatus to:

transmit either the first set of sounding reference signals via the first sounding reference signal resource set or the second set of sounding reference signals via the second sounding reference signal resource set.

30. The apparatus of claim 29, wherein the instructions are further executable by the one or more processors to cause the apparatus to:

determine whether to transmit the first set of sounding reference signals via the first sounding reference signal resource set or the second set of sounding reference signals via the second sounding reference signal resource set based at least in part on a first usage, index, or configuration of the first sounding reference signal resource set and a second usage, index, or configuration of the second sounding reference signal resource set.

* * * * *